US012525198B2

(12) United States Patent
Kwon et al.

(10) Patent No.: US 12,525,198 B2
(45) Date of Patent: Jan. 13, 2026

(54) GATE DRIVER AND DISPLAY DEVICE INCLUDING SAME

(71) Applicant: LG Display Co., Ltd., Seoul (KR)

(72) Inventors: Ki Tae Kwon, Paju-si (KR); Seung Hwan Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/809,097

(22) Filed: Aug. 19, 2024

(65) Prior Publication Data

US 2025/0118266 A1 Apr. 10, 2025

(30) Foreign Application Priority Data

Oct. 5, 2023 (KR) ........................ 10-2023-0132315

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/0286* (2013.01); *G09G 2310/04* (2013.01); *G09G 2310/08* (2013.01); *G09G 2340/0435* (2013.01); *G09G 2370/00* (2013.01)

(58) Field of Classification Search
CPC ..... G09G 3/3266; G09G 3/3674–3681; G09G 2310/0264–0267; G09G 2310/0278; G09G 2310/0286; G09G 2310/04; G09G 2310/08; G09G 2330/0435; G09G 2330/0442; G11C 19/00–38; G11C 27/04
See application file for complete search history.

(56) References Cited

U.S. PATENT DOCUMENTS

| | | | | |
|---|---|---|---|---|
| 11,580,886 | B2 | 2/2023 | Kwon et al. | |
| 11,928,998 | B2 | 3/2024 | Kwon et al. | |
| 2018/0144688 | A1* | 5/2018 | Lee | G09G 3/3266 |
| 2020/0357362 | A1* | 11/2020 | Shin | G09G 3/3233 |
| 2022/0028314 | A1 | 1/2022 | Kwon et al. | |

(Continued)

FOREIGN PATENT DOCUMENTS

| | | | |
|---|---|---|---|
| KR | 10-2021-0144403 | A | 11/2021 |
| KR | 10-2022-0014373 | A | 2/2022 |

(Continued)

*Primary Examiner* — Roberto W Flores
(74) *Attorney, Agent, or Firm* — Fenwick & West LLP

(57) ABSTRACT

A gate driver and a display device are disclosed. The gate driver includes a plurality of signal transmitters dependently connected via a carry line through which a carry signal is applied from a previous signal transmitter, wherein an nth (n being a positive integer) signal transmitter includes a first circuit part configured to receive the carry signal from the previous signal transmitter and charge or discharge a first control node and a second control node; a second circuit part configured to output a gate signal based on voltages at the first control node and the second control node; and a selection portion configured to invert a voltage applied to a first node during a frame skip interval of a partial area in a pixel array driven at a predetermined frame frequency, and charge the first control node with a voltage of the first node.

13 Claims, 32 Drawing Sheets

(56) References Cited

U.S. PATENT DOCUMENTS

| | | | |
|---|---|---|---|
| 2022/0148503 | A1 | 5/2022 | Seo et al. |
| 2023/0026979 | A1 | 1/2023 | Kwon et al. |
| 2023/0196959 | A1 | 6/2023 | Kwon et al. |

FOREIGN PATENT DOCUMENTS

| | | | |
|---|---|---|---|
| KR | 10-2022-0064463 | A | 5/2022 |
| KR | 10-2023-0016744 | A | 2/2023 |

* cited by examiner

GATE DRIVER AND DISPLAY DEVICE INCLUDING SAME

CROSS-REFERENCE TO RELATED APPLICATION

This application claims priority benefit of Republic of Korea Patent Application No. 10-2023-0132315, filed Oct. 5, 2023, which is hereby incorporated by reference in its entirety.

BACKGROUND

1. Field

The present disclosure relates to a gate driver and a display device, and more particularly, for example, but limited to a gate driver that can be driven at different frequencies for each area and a display device including the same.

2. Discussion of Related Art

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

In organic light-emitting display devices, organic light-emitting diodes (referred to as "OLEDs") are formed in each of pixels. These organic light display devices not only respond quickly and have excellent light-emitting efficiency, luminance, and viewing angle, but also have excellent contrast ratio and color reproduction rate because they can express black tones as complete black.

A user may play two or more content images on one screen of a display device or may run two or more applications to play images of different applications on the screen. In this multi-tasking environment, the pixels of the display device are driven at a single frame frequency.

The gate driver of a typical display device outputs gate signals sequentially.

SUMMARY

The inventors have recognized that, in the related art, since the gate driver does not have a separate structure that can block the output in the middle of one frame, it is impossible to drive at different frequencies for each area within the panel. Accordingly, the present disclosure is directed to solving the above-described problems.

The present disclosure provides a gate driver that can be driven at different frequencies for each area and a display device including the same.

It should be noted that objects of the present disclosure are not limited to the above-described objects, and other objects of the present disclosure will be apparent to those skilled in the art from the following descriptions.

A gate driver according to example embodiments of the present disclosure may include a plurality of signal transmitters dependently connected via a carry line through which a carry signal is applied from a previous signal transmitter, wherein an nth (n being a positive integer) signal transmitter includes a first circuit part configured to receive the carry signal from the previous signal transmitter and charge or discharge a first control node and a second control node; a second circuit part configured to output a gate signal based on voltages at the first control node and the second control node; and a selection portion configured to invert a voltage applied to a first node during a frame skip interval of a partial area in a pixel array driven at a predetermined frame frequency, and charge the first control node with a voltage of the first node.

A display device according to example embodiments of the present disclosure may include a pixel array in which a plurality of data lines, a plurality of gate lines, and a plurality of pixel circuits are disposed; a data driver configured to output a data voltage to the plurality of data lines; and a gate driver configured to output a gate signal to the plurality of gate lines, wherein the pixel array includes a first pixel array driven at a first frame frequency, and a second pixel array driven at a second frame frequency lower than the first frame frequency, and the gate driver outputs the gate signal as a gate-off voltage during a frame skip interval of the second pixel array.

According to the present disclosure, a frame skip may be implemented by blocking the output of a gate signal depending on an area, so that each area may be driven at a different frequency.

According to the present disclosure, the position for dividing the areas to drive them at different frequencies may be easily changed by changing an interval where the output of a gate signal is blocked.

According to the present disclosure, the position for dividing the frequency may be freely adjusted according to the user's working environment, so that power consumption may be reduced and low-power driving may be possible.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary example embodiments thereof in detail with reference to the attached drawings, in which.

Figure 1:
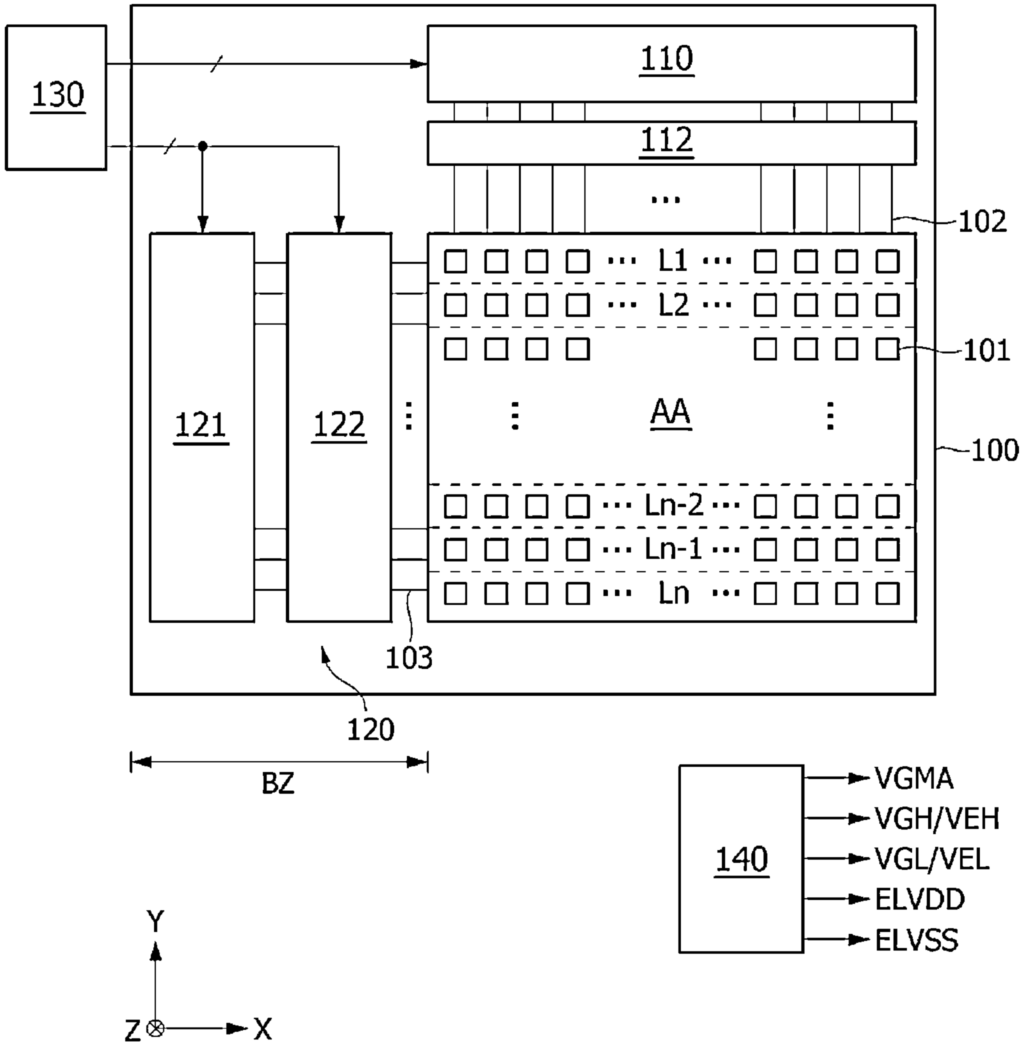
FIG. 1 is a block diagram illustrating a display device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Advantages and features of the present specification and methods of achieving them will become apparent with reference to preferable example embodiments, which are described in detail, in conjunction with the accompanying drawings. However, the present specification is not limited to the example embodiments to be described below and may be implemented in different forms, the example embodiments are only provided to completely disclose the present disclosure and completely convey the scope of the present disclosure to those skilled in the art, and the present specification is defined by the disclosed claims.

Since the shapes, sizes, areas, proportions, angles, numbers, and the like disclosed in the drawings for describing the example embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When "include," "have," "comprise," "contain," "constitute," "make up of," and "formed of," and the like mentioned in the present specification are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as "on", "above", "over", "below", "under", "beside", "beneath", "near", "close to," "adjacent to", "on a side of", "next", and the like, one or more other parts may be located between the two parts unless 'immediately' or 'directly' is used.

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

In describing temporal relationship, terms such as "after," "subsequent to," "following," "next," "before," and the like may include cases where any two events are not consecutive, unless the term such as "immediately" "just" or "directly" is explicitly used.

Although "first", "second", "A", "B", "(a)", "(b)", and the like are used to describe various components, these components are not limited by these terms. These terms are only used to distinguish one component from another. Accordingly, a first component, which is mentioned, below may also be a second component within the technical spirit of the present disclosure.

In addition, terms, such as first, second, A, B, (a), (b), or the like may be used herein when describing components of the present disclosure. Each of these terminologies is not used to define an essence, order, or sequence of a corresponding component but used merely to distinguish the corresponding component from other components. In the case that it is described that a certain structural element or layer is "connected", "coupled", "adhered" or "joined" to another structural element or layer, it is typically interpreted that another structural element or layer may be "connected", "coupled", "adhered" or "joined" to the structural element or layer directly or indirectly.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A term "device" used herein may refer to a display device including a display panel and a driver for driving the display panel. Examples of the display device may include a light emitting device, and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including the light emitting device and the like, but embodiments of the present disclosure are not limited thereto.

The same reference numerals may refer to substantially the same elements throughout the present disclosure.

The following example embodiments can be partially or entirely bonded to or combined with each other and can be linked and operated in technically various ways. The example embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, various example embodiments of the present disclosure will be described in detail with reference to the accompanying drawings.

In an example embodiment, a frame skip is implemented by blocking the output of the gate signal, and each area is driven at a different frequency using the frame skip, and the position for dividing the area is also changeable using an interval where the gate signal is blocked.

FIG. 1 is a block diagram of a display device according to an embodiment of the present disclosure.

Referring to FIG. 1, the display device according to an example embodiment of the present disclosure includes a display panel 100, a display panel driving circuit for writing pixel data to pixels of the display panel 100, and a power supply 140 for generating power necessary for driving the pixels and the display panel driving circuit, but components of the display device of the present disclosure are not limited thereto. Meanwhile, all the components of each display device according to all embodiments of the present disclosure are operatively coupled and configured.

The display panel 100 includes a pixel array AA that displays an input image. The pixel array AA includes a plurality of data lines 102, a plurality of gate lines 103 intersected with the data lines 102, and pixels disposed in a region defined by the plurality of data lines 102 and the plurality of gate lines 103 which intersect each other in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the same gate line 103. Sub-pixels arranged in a column direction Y along a data line direction share the same data line 102. One horizontal period 1H is a time obtained by dividing one frame period by the total number of pixel lines L1 to Ln.

Touch sensors may be implemented in the form of a touch panel outside of the display panel 100 or be integrated inside of the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA. In the example where the add-on type of touch sensor is disposed in the display panel 100, the touch panel and the display panel 100 may be separately manufactured and combined in an assembly process, and the add-on type of touch panel may include a touch panel substrate and a plurality of touch electrodes on the touch panel substrate. In the example where the in-cell type touch sensors are disposed in the display panel 100, the touch sensor may be formed on the substrate SUB together with signal lines and electrodes related to display driving during a process of manufacturing the display panel 100.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film so as to supply power or signals applied to the pixel array AA and the touch sensor array.

The plurality of sub pixels SP is a minimum unit which configures the active area and n sub pixels SP form one pixel PX. Each of the plurality of sub pixels SP may emit light having different wavelengths from each other. The plurality of sub pixels may include first to third sub pixels which emit different color light from each other. To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel.

For example, the plurality of sub pixels SP may include red, green, and blue sub-pixels, in which the red, green, and blue sub-pixels ("R sub-pixel", "G sub-pixel", and "B sub-pixel") may be disposed in a repeated manner. Alternatively, the plurality of sub pixels SP may include red, green, blue, and white sub-pixels, in which the red, green, blue, and white sub-pixels may be disposed in a repeated manner, or the red, green, blue, and white sub-pixels may be disposed in a quad type. For example, the red sub pixel, the blue sub pixel, and the green sub pixel may be sequentially disposed along a row direction, or the red sub pixel, the blue sub pixel, the green sub pixel and the white sub pixel may be sequentially disposed along the row direction. However, in the example embodiment of the present disclosure, the color type, disposition type, and disposition order of the sub-pixels are not limiting, and may be configured in various forms according to light-emitting characteristics, device lifespans, and device specifications.

Meanwhile, the sub-pixels may have different light-emitting areas according to light-emitting characteristics. For example, a sub-pixel that emits light of a color different from that of a blue sub-pixel may have a different light-emitting area from that of the blue sub-pixel. For example, the red sub-pixel, the blue sub-pixel, and the green sub-pixel, or the red sub-pixel, the blue sub-pixel, the white sub-pixel, and the green sub-pixel may each has a different light-emitting area.

Each of the sub-pixels 101 includes a pixel circuit. The pixel circuit is a circuit which includes the driving transistor, some other transistors and a capacitor to drive a light emitting element. For example, the pixel circuit may include the driving transistor, a switching transistor, a sensing transistor, and an emission control transistor to supply a driving current to the light emitting element. The transistors other than the driving transistor, among the plurality of transistors included in the pixel circuit and the capacitor may be configured in various forms depending on the design and the present disclosure is not limited thereto.

The driving transistor includes a driving active layer ACT, a driving gate electrode GE, a driving source electrode SE, and a driving drain electrode DE.

The driving active layer ACT may be formed of a semiconductor material, such as an oxide semiconductor, amorphous semiconductor, or polycrystalline semiconductor, but is not limited thereto.

The oxide semiconductor material may have an excellent effect of preventing a leakage current and relatively inexpensive manufacturing cost. The oxide semiconductor may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The polycrystalline semiconductor material has a fast movement speed of carriers such as electrons and holes and thus has high mobility, and has low energy power consumption and superior reliability. The polycrystalline semiconductor may be made of polycrystalline silicon (poly-Si), but is not limited thereto.

The amorphous semiconductor material may be made of amorphous silicon (a-Si), but is not limited thereto.

The pixel circuit is connected to the data line 102 and the gate line 103.

The power supply 140 generates direct current (DC) power required for driving the pixel array AA and the display panel driving circuit of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage EVDD, and a pixel low-potential power supply voltage EVSS. The gamma reference voltage VGMA is supplied to a data driver 110. The gate-on voltages VGH and VEH and the gate-off voltages VGL and VEL are supplied to a gate driver 120. The pixel driving voltage EVDD and the pixel low-potential power supply voltage EVSS are commonly supplied to the pixels.

The display panel driving circuit applies an analog voltage corresponding to pixel data (digital data) of an input image to the pixels of the display panel 100 under the control of a timing controller (TCON) 130.

The display panel driving circuit includes the data driver 110 and the gate driver 120.

A de-multiplexer (DEMUX) 112 may be disposed between the data driver 110 and the data lines 102. The de-multiplexer 112 sequentially connects one channel of the data driver 110 to the plurality of data lines 102 and distributes in a time division manner the data voltage outputted from one channel of the data driver 110 to the data lines 102, thereby reducing the number of channels of the data driver 110. The de-multiplexer 112 may be omitted. In this case, output buffers AMP of the data driver 110 are directly connected to the data lines 102.

The display panel driving circuit may further include a touch sensor driver for driving the touch sensors. The touch sensor driver is omitted from FIG. 1. In a mobile device, the timing controller 130, the power supply 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer AMP in each of the channels of the data driver 110. Even though in FIG. 1, it is illustrated that one data driver 110 is disposed at one side of the display panel 100, the number of the data driver 110 and the placement thereof are not limited thereto. For example, two data driver 110 may be disposed at two sides of the display panel 100, respectively. For example, a plurality of data driver 110 may be disposed at one side of the display panel 100. The data driver 110 may be disposed by a chip on glass (COG), a chip on film (COF), or a tape carrier package (TCP) technique depending on a mounting method, but is not limited thereto.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 may sequentially supply the gate signals to the gate lines 103 by shifting the gate signals using a shift register. Even though in FIG. 1, it is illustrated that the gate driver 120 is disposed at one side of the display panel 100, the number of the gate drivers 120 and the placement thereof are not limited thereto. For example, the gate drivers 120 may be disposed at two sides of the display panel 100, respectively.

The gate signal may include a scan signal for selecting pixels of a line in which data is to be written in synchronization with the data voltage, and an EM signal defining an emission time of pixels charged with the data voltage.

The gate driver 120 may include a scan driver 121, and an emission (EM) driver 122.

The scan driver 121 outputs a scan signal SCAN in response to a start pulse and a shift clock from the timing controller 130, and shifts the scan signal SCAN according to the shift clock timing. The EM driver 122 outputs an EM signal EM in response to a start pulse and a shift clock from the timing controller 130, and sequentially shifts the EM signal EM according to the shift clock. The initialization driver 123 outputs an initialization signal INIT in response to a start pulse and a shift clock from the timing controller 130, and shifts the initialization signal INIT according to the shift clock timing. Therefore, the scan signal SCAN, the EM signal EM, and the initialization signal INIT are sequentially supplied to the gate lines 103 of the pixel lines L1 to Ln. In case of a bezel-free model, at least some of transistors constituting the gate driver 120 and clock wirings may be dispersedly disposed in the pixel array AA.

The timing controller 130 receives, from a host system (not shown), digital video data DATA of an input image and a timing signal synchronized therewith. The timing signal includes a vertical synchronization signal Vsync, a horizontal synchronization signal Hsync, a clock signal CLK, a data enable signal DE, and the like. Here, the horizontal synchronization signal is a signal representing a time taken to display one horizontal line of a screen and the vertical synchronization signal is a signal representing a time taken to display a screen of one frame. The data enable signal may correspond to a signal indicating a period for which a data voltage is supplied to the pixel. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system may be any one of a television (TV) system, a set-top box, a navigation system, a personal computer (PC), a home theater system, a vehicle system, and a mobile device system.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low-level voltage of the gate timing control signal into the gate-off voltages VGL and VEL and converts a high level voltage of the gate timing control signal into the gate-on voltages VGH and VEH. The gate timing control signal includes the start pulse and the shift clock.

The timing controller 130 according to an example embodiment may control the operation of the data driver 110 using a data timing signal and control the operation of the gate driver 120 using a gate timing control signal. For example, during a frame skip interval, the timing controller 130 may control the data driver 110 not to output a data voltage, and may control the gate driver 120 not to output a gate signal, i.e., control the gate signal outputted by the gate driver 120 to become a gate-off voltage.

In an example embodiment of the present disclosure, a plurality of areas may be driven at different frequencies using the frame skip, and the position for dividing the plurality of areas may also be changed. Here, the plurality of areas may include a first pixel array and a second pixel array.

Figure 2:
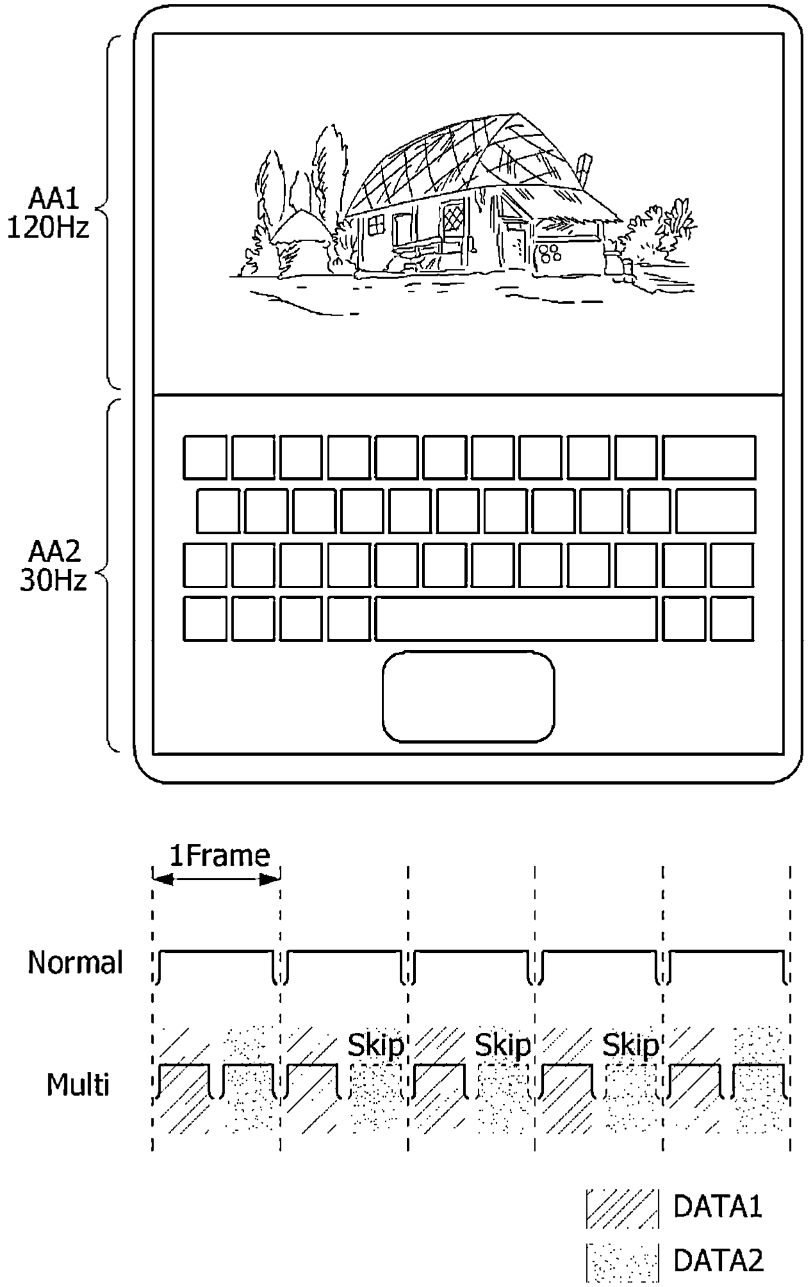
FIGS. 2 and 3 are diagrams illustrating a principle of driving at different frequencies according to an embodiment of the present disclosure.
Figure 3:
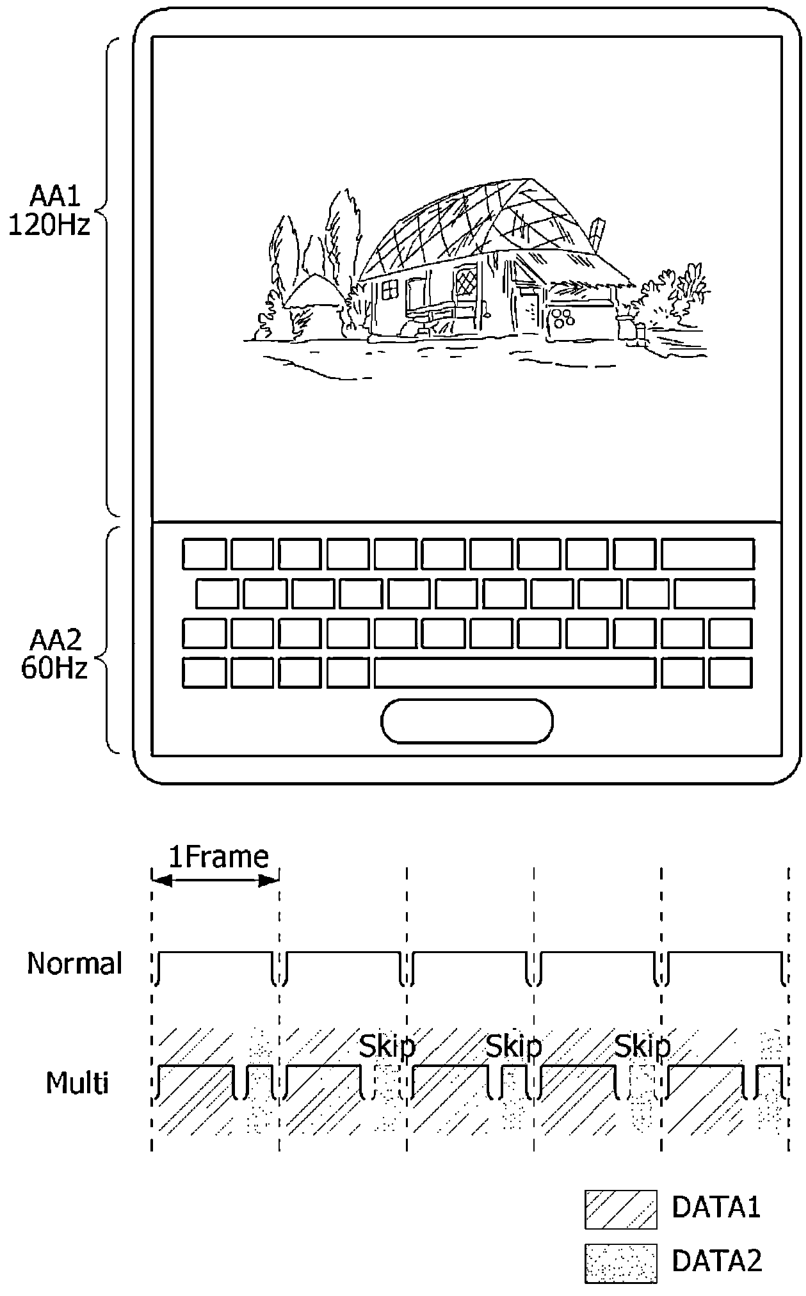

FIGS. 2 and 3 are diagrams illustrating a principle of driving at different frequencies.

Referring to FIG. 2, in an embodiment, the screen may be divided into two areas, e.g., a first area AA1 and a second area AA2, and the first area AA1 may be driven at a frequency of 120 Hz (e.g., a first frequency), and the second area AA2 may be driven at a frequency of 30 Hz (e.g., a second frequency).

In a normal driving mode, image data is applied to the entire areas AA1 and AA2 in one frame interval. In a multi-driving mode in which the first area AA1 and the second area AA2 are divided, first image data DATA1 is applied to the first area AA1 and second image data DATA2 is applied to the second area AA2, in one frame interval. For example, the first image data DATA1 may be moving image data, while the second image data DATA2 may be still image data.

In this case, image data may not be applied to the second area AA2 during the frame skip interval according to the driving frequency.

For example, when the first area is driven at a frequency of 120 Hz and the second area is driven at a frequency of 30 Hz, the first image data is applied to the first area AA1 in every frame interval, while the second image data is not applied to the second area AA2 for three frame intervals every four frame intervals.

In this case, since the first area AA1 and the second area AA2 are divided into equal sizes, the durations during which the first image data and the second image data are applied in each frame interval are formed to be the same.

Referring to FIG. 3, in an embodiment, the screen is divided into two areas, i.e., the first area AA1 and the second area AA2, and the first area AA1 may be driven at a frequency of 120 Hz (e.g., a first frequency), and the second area AA2 may be driven at a frequency of 60 Hz (e.g., a second frequency).

For example, when the first area AA1 is driven at a frequency of 120 Hz and the second area AA2 is driven at a frequency of 60 Hz, the first image data DATA1 is applied to the first area AA1 in every frame interval, while the second image data DATA2 is not applied to the second area AA2 for one frame interval every two frame intervals.

In this case, since the first area AA1 and the second area AA2 are divided into different sizes, the durations during which the first image data DATA1 and the second image data DATA2 are applied in each frame interval are formed to be different.

Here, a case in which the image data is not applied to the second area is described as an example, but the present disclosure is not necessarily limited thereto. For example, the image data may not be applied to the first area, or the image data may not be applied to both the first area and the second area. As described above with reference to FIG. 2 and FIG. 3, in order to operate the divided areas at different driving frequencies using the frame skip, it may be implemented by blocking the gate signal applied to the second area during the frame skip interval In FIG. 2 and FIG. 3, the screen is divided into two areas, e.g., a first area AA1 and a second area AA2, however, embodiments of the present disclosure are not limited thereto, the screen may be divided into three or more areas. For example, when a plurality of areas is divided into equal sizes, the durations during which a plurality of image data is applied in each frame interval are formed to be the same. Alternatively, when the plurality of areas is divided into different sizes, the durations during which the plurality of image data is applied in each frame interval are formed to be different. However, the present disclosure is not limited thereto.

Figure 4:
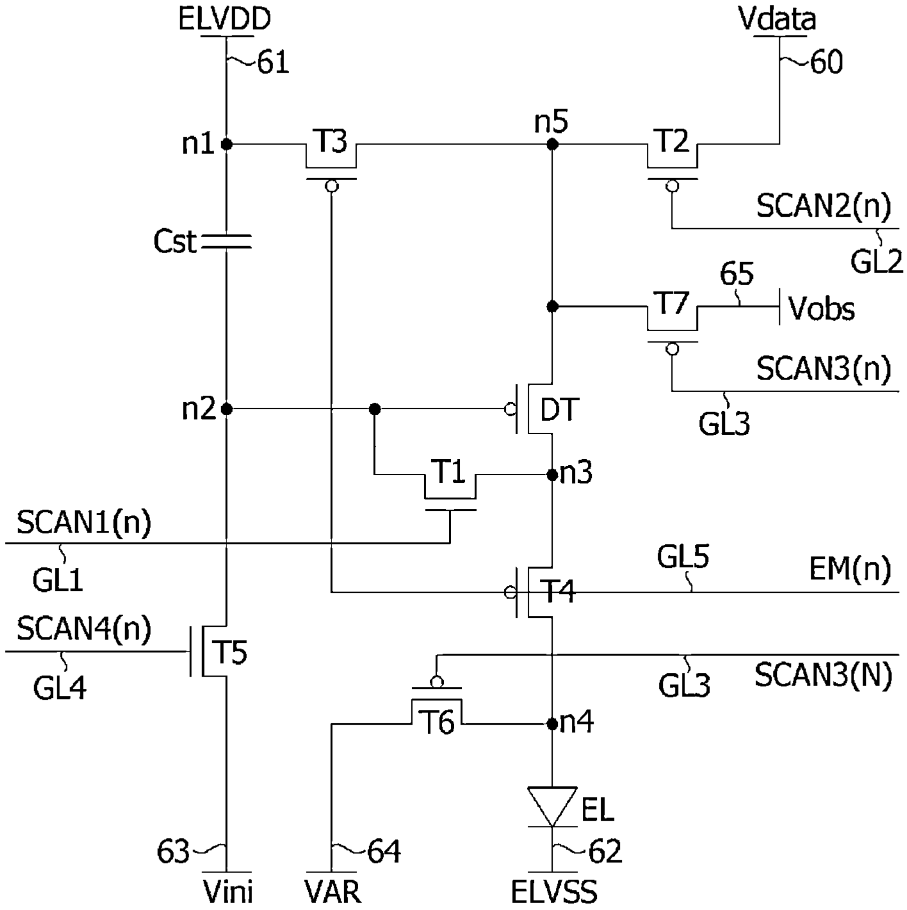
FIG. 4 is a diagram illustrating a pixel circuit according to a first embodiment of the present disclosure.
Figure 5:
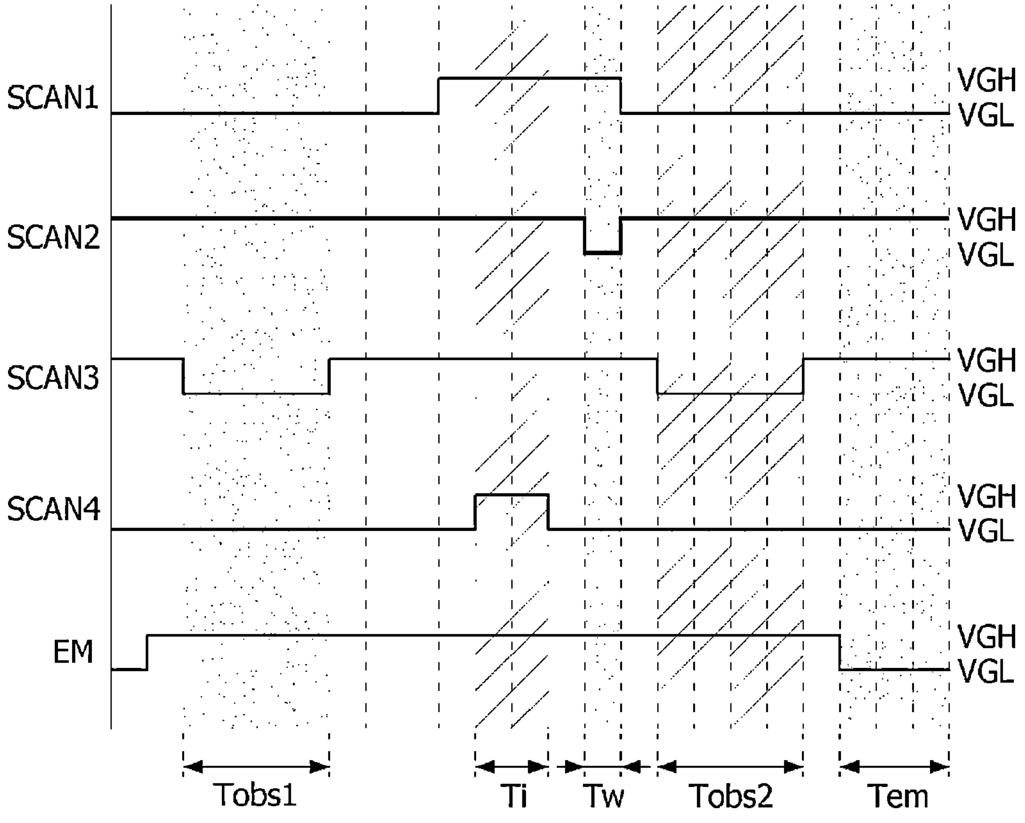
FIG. 5 is a diagram illustrating a driving timing of the pixel circuit shown in FIG. 4 according to an embodiment of the present disclosure.

FIG. 4 is a diagram illustrating a pixel circuit according to a first embodiment of the present disclosure. FIG. 5 is a diagram illustrating a driving timing of the pixel circuit shown in FIG. 4 according to an embodiment.

Referring to FIGS. 4 to 5, a pixel circuit according to a first embodiment of the present disclosure includes a light emitting element EL, a driving element DT for supplying a current to the light emitting element EL, a plurality of switch elements T1, T2, T3, T4, T5, T6, and T7 for switching a current path connected to the driving element DT, and a first capacitor Cst for storing the gate-source voltage of the driving element DT. The driving element DT and the switch elements T2, T3, T4, T6, and T7 may be implemented as P-channel oxide TFTs, and the switch elements T1 and T5 may be implemented as N-channel oxide TFTs.

The gate signal applied to the pixel circuit includes a first scan signal SCAN1(n), a second scan signal SCAN2(n), a third scan signal SCAN3(n), a fourth scan signal SCAN4(n), and an EM signal EM(n). Here, N is a natural number.

The capacitor Cst is connected between a first node n1 and a second node n2. A pixel driving voltage ELVDD is supplied to the pixel circuit through an ELVDD wire. The first node n1 is connected to the ELVDD wire, the first electrode of a third switch element T3, and the first electrode of the capacitor Cst. The second node n2 is connected to the second electrode of the capacitor Cst, the gate electrode of the driving element DT, the first electrode of a first switch element T1, and the first electrode of a fifth switch element T5.

The first switch element T1 is turned on in response to a gate-on voltage VGH of the first scan signal SCAN1(n) and connects the gate electrode of the driving element DT to the first electrode thereof. The first switch element T1 includes the gate electrode connected to a first scan line GL1, the first electrode connected to the second node n2, and the second electrode connected to a third node n3. The first scan signal SCAN1(n) is supplied to pixels through the first scan line GL1. The third node n3 is connected to the second electrode of the driving element DT, the second electrode of the first switch element T1, and the first electrode of a fourth switch element T4.

A second switch element T2 is turned on in response to a gate-on voltage VGL of the second scan signal SCAN2(n) and applies a data voltage Vdata to the first electrode of the driving element DT. The second switch element T2 includes the gate electrode connected to a second scan line GL2, the first electrode connected to a fifth node n5, and the second electrode connected to a data line 60. The fifth node n5 is connected to the first electrode of the driving element DT, the first electrode of the second switch element T2, and the second electrode of the third switch element T3.

The third switch element T3 supplies the pixel driving voltage ELVDD to the first electrode of the driving element DT in response to the EM signal EM(n). The third switch element T3 includes the gate electrode connected to an EM line GL5, the first electrode connected to the ELVDD wire, and the second electrode connected to the fifth node n5. The EM signal EM(n) is supplied to the pixels through the EM line GL5.

The fourth switch element T4 is turned on in response to the gate-on voltage VGL of the EM signal EM(n) and connects the second electrode of the driving element DT to the anode electrode of the light emitting element EL. The gate electrode of the fourth switch element T4 is connected to the EM line GL5. The first electrode of the fourth switch element T4 is connected to the third node n3, and the second electrode of the fourth switch element T4 is connected to a fourth node n4. The fourth node n4 is connected to the anode electrode of the light emitting element EL, the second electrode of the fourth switch element T4, and the second electrode of a sixth switch element T6.

The fifth switch element T5 is turned on in response to the gate-on voltage VGH of the fourth scan signal SCAN4(n) and connects the second node n2 to a Vini wire 63 to initialize the capacitor Cst and the gate of the driving element DT during an initialization phase Ti. The fifth switch element T5 includes the gate electrode connected to a fourth scan line GL4, the first electrode connected to the second node n2, and the second electrode connected to the Vini wire 63. The fourth scan signal SCAN4(n) is supplied to the pixels through the fourth scan line GL4. An initialization voltage Vini is supplied to the pixels through the Vini wire 63.

The sixth switch element T6 is turned on in response to the gate-on voltage VGL of the third scan signal SCAN3(n) and connects a VAR wire 64 to the anode electrode of the light emitting element EL during a first OBS phase Tobs1 and a second OBS phase Tobs2. During the first OBS phase Tobs1 and the second OBS phase Tobs2, the anode voltage of the light emitting element EL is discharged to a reset voltage VAR through the sixth switch element T6. In this case, the light emitting element EL does not emit light since a voltage between the anode and the cathode is lower than its threshold voltage. The sixth switch element T6 includes the gate electrode connected to a third scan line GL3, the first electrode connected to the VAR wire 64, and the second electrode connected to the fourth node n4.

A seventh switch element T7 is turned on in response to the gate-on voltage VGL of the third scan signal SCAN3(n) and connects the fifth node n5 to a Vobs wire 65 during the first OBS phase Tobs1 and the second OBS phase Tobs2 to apply a bias voltage Vobs. During the first OBS phase Tobs1 and the second OBS phase Tobs2, the voltage of the first electrode of the driving element DT is discharged to the bias voltage Vobs through the seventh switch element T7. The seventh switch element T7 includes the gate electrode connected to the third scan line GL3, the first electrode connected to the fifth node n5, and the second electrode connected to the Vobs wire 65.

The driving element DT drives the light emitting element EL by controlling a current flowing through the light emitting element EL based on a gate-source voltage Vgs. The driving element DT includes the gate electrode connected to the second node n2, the first electrode connected to the fifth node n5, and the second electrode connected to the third node n3.

The light emitting element EL is connected between the fourth node n4 and an ELVSS wire. The light emitting element EL may be implemented as an OLED. The OLED includes an organic compound layer formed between the anode and the cathode. The organic compound layer may include a hole injection layer HIL, a hole transport layer HTL, an emission layer EML, an electron transport layer ETL, and an electron injection layer EIL, but is not limited thereto. When a voltage is applied to the anode and cathode of the OLED, holes that have passed through the hole transport layer HTL and electrons that have passed through the electron transport layer ETL move to the emission layer EML to form excitons, and as a result, visible light is emitted from the emission layer EML.

In the first OBS phase Tobs1, the seventh switch element T7 is turned on, so that the voltage of the fifth node n5 is discharged to the bias voltage Vobs.

In the initialization phase Ti, the first switch element T1 and the fifth switch element T5 are turned on, so that the voltages of the second node n2 and the third node n3 are discharged to the initialization voltage Vini.

In a data writing phase Tw, the second switch element T2 is turned on, so that the data voltage is applied to the fifth node n5 and the voltage of the second node n2 becomes a voltage of Vdata+Vth. A threshold voltage Vth of the driving element DT is sensed and charged to the capacitor Cst connected to the second node n2.

In the second OBS phase Tobs2, the seventh switch element T7 is turned on, so that the voltage of the fifth node n5 is discharged to the bias voltage Vobs.

In an emission phase Tem, the third switch element T3 and the fourth switch element T4 are turned on, so that a current flows through the driving element DT to the light emitting element EL, causing the light emitting element EL to emit light.

Since the method of implementing the frame skip is to prevent the output of the gate signal, it may be possible to achieve this by preventing the output of the first and fourth scan signals among five signals, i.e., the first to fourth scan signals and the EM signal, to the pixel circuit of FIG. 4. For example, the first switch element T1 and the fifth switch element T5 are turned off such that the voltages of the second node n2 and the third node n3 are not initialized at the time of the frame skip.

In FIG. 4, the pixel circuit is shown as a structure of 8T1C. However, the present disclosure is not limited thereto, in the pixel circuit of the present disclosure, various configurations of internal compensation circuits are possible. For example, a number of transistors TFTs in the pixel circuit of the present disclosure may be three or more, and a number of capacitor may be one or more, for example, the pixel circuit of the present disclosure may be a 5T1C pixel circuit including five TFTs and one capacitor, a 5T2C pixel circuit including five TFTs and two capacitors, a 7T2C pixel circuit including seven TFTs and two capacitors, a 8T2C pixel circuit including eight TFTs and two capacitors, or the like.

Figure 6:
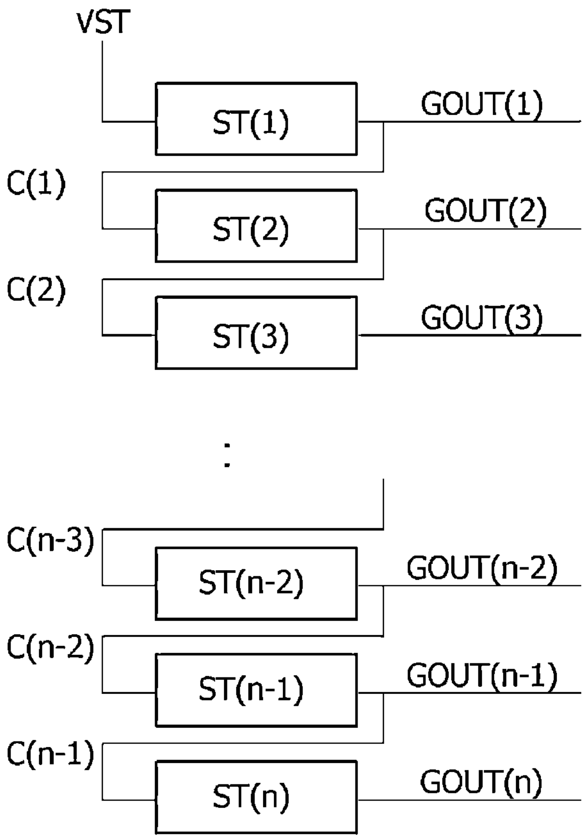
FIG. 6 is a diagram illustrating a shift register of a gate driver according to an embodiment of the present disclosure.

FIG. 6 is a diagram illustrating a shift register of a gate driver according to an embodiment of the present disclosure.

Referring to FIG. 6, the gate driver according to an example embodiment includes a plurality of signal transmitters ST(1), ST(2), ST(3), . . . , ST(n-2), ST(n-1), and ST(n), which are dependently connected via a carry line through which a carry signal is transmitted.

Each of the signal transmitters ST(1), ST(2), ST(3), . . . , ST(n-2), ST(n-1), and ST(n) receives a start pulse VST, or a clock signal CLK and a carry signal outputted from the previous signal transmitter. A first signal transmitter ST(1) starts to be driven in response to the start pulse VST, and the other signal transmitters ST(2), ST(3), . . . , ST(n-2), ST(n-1), ST(n) start to be driven by receiving carry signals C(1), C(2), . . . , C(n-3), C(n-2), C(n-1) from their previous signal transmitters, respectively.

The signal transmitters ST(1), ST(2), ST(3), . . . , ST(n-2), ST(n-1), and ST(n) sequentially output gate signals GOUT (1), GOUT(2), GOUT(3), . . . , GOUT(n-2), GOUT(n-1), and GOUT(n) by shifting the start pulse VST or the carry signals C(1), C(2), . . . , C(n-3), C(n-2), C(n-1) outputted from their previous signal transmitters in accordance with the timing of the clock signal.

In this case, if a signal transmitter that starts the frame skip interval does not output the gate signal, the carry signal is also not outputted, and thus the next signal transmitter also does not output the gate signal. For example, if the signal transmitter ST(1) does not output the gate signal, all of the following signal transmitters ST(2), ST(3), . . . , ST(n-2), ST(n-1), and ST(n) do not output the gate signal. For example, if the signal transmitter ST(n-2) does not output the gate signal, all of the following signal transmitters ST(n-1) and ST(n) do not output the gate signal. Here, not outputting the gate signal means outputting the gate-off voltage.

Figure 7:
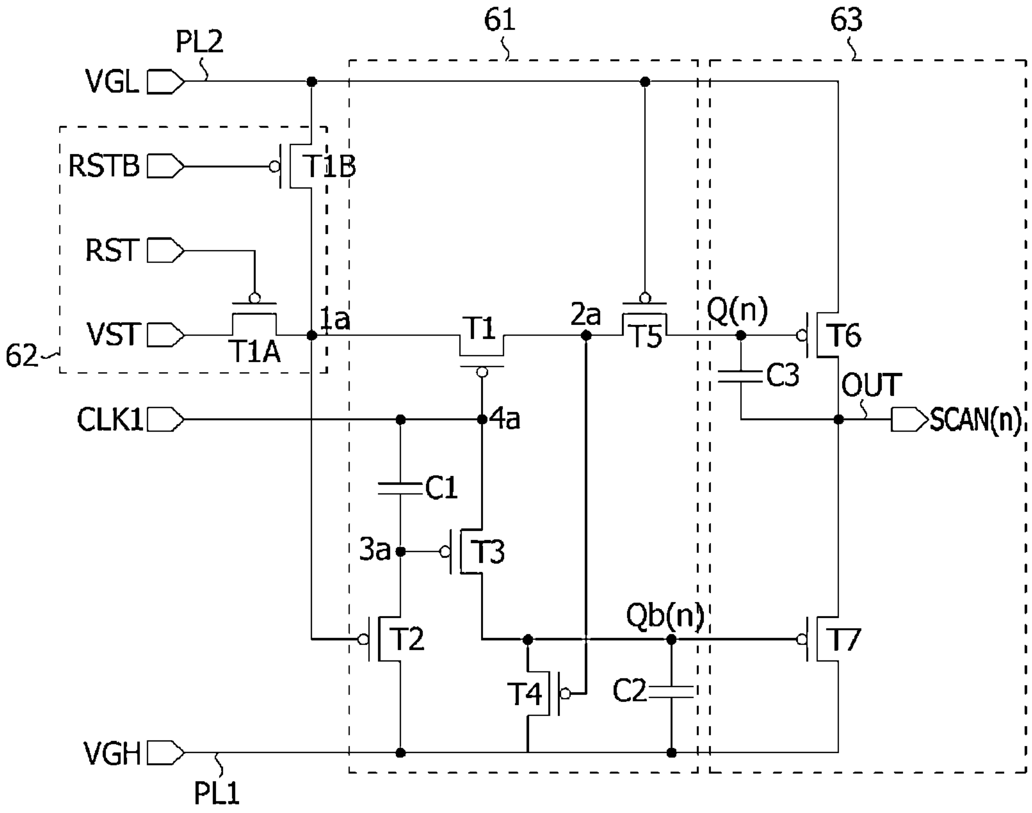
FIG. 7 is a diagram illustrating a gate driver according to a first embodiment.
Figure 8A:
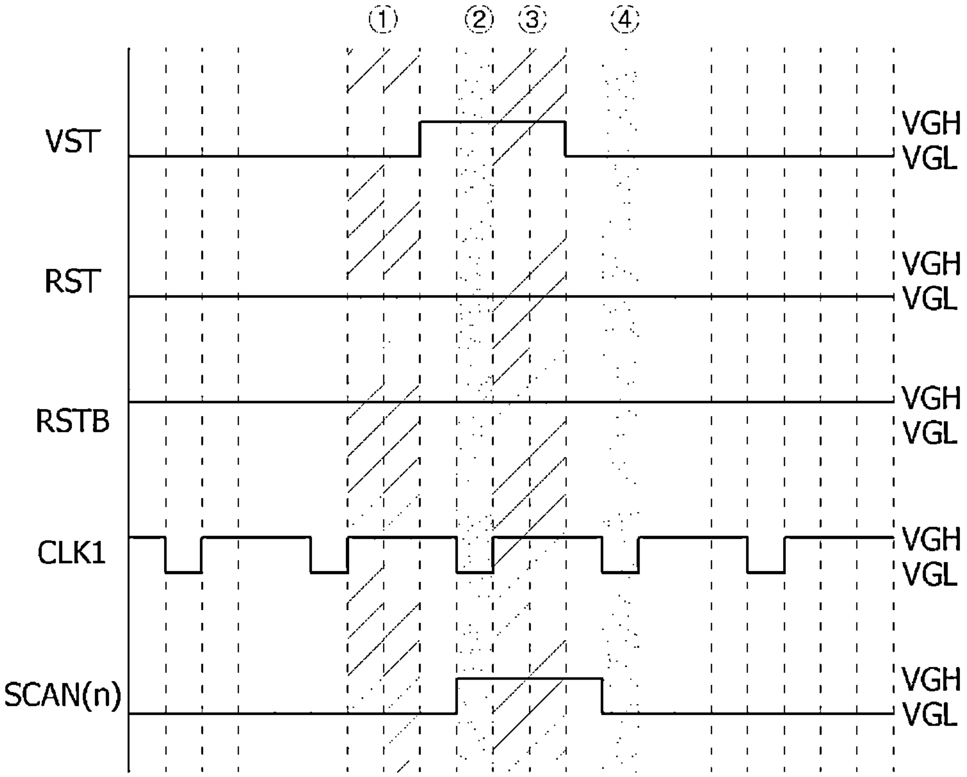
FIG. 8A and FIG. 8B are diagrams illustrating driving waveforms of the gate driver shown in FIG. 7 according to an embodiment of the present disclosure.
Figure 8B:
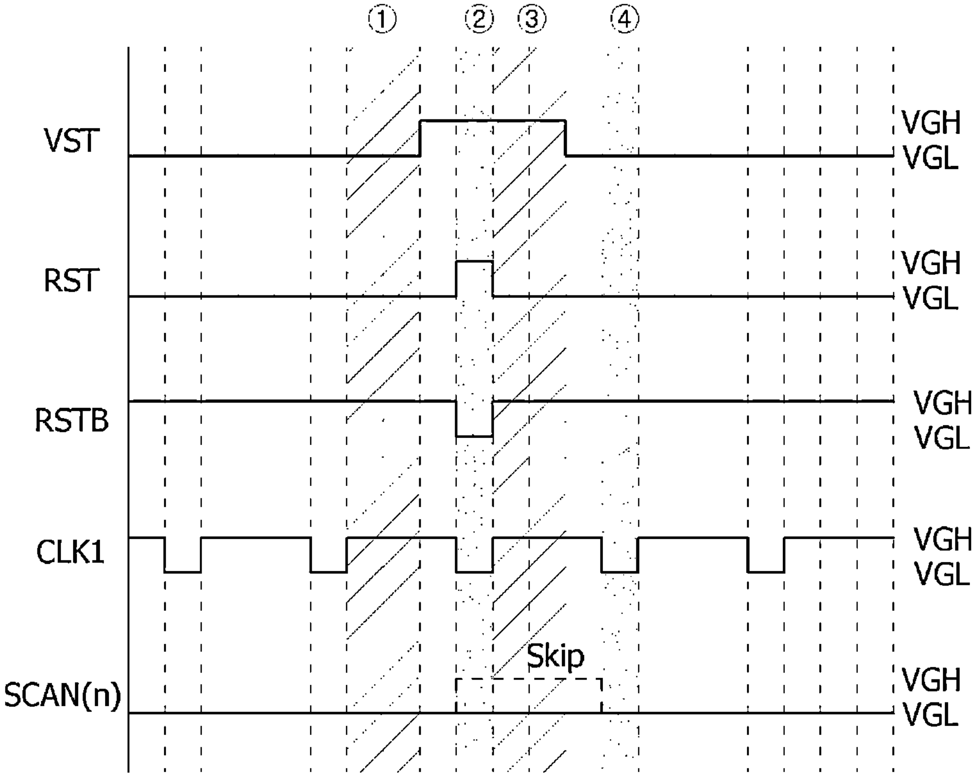
Figure 9A:
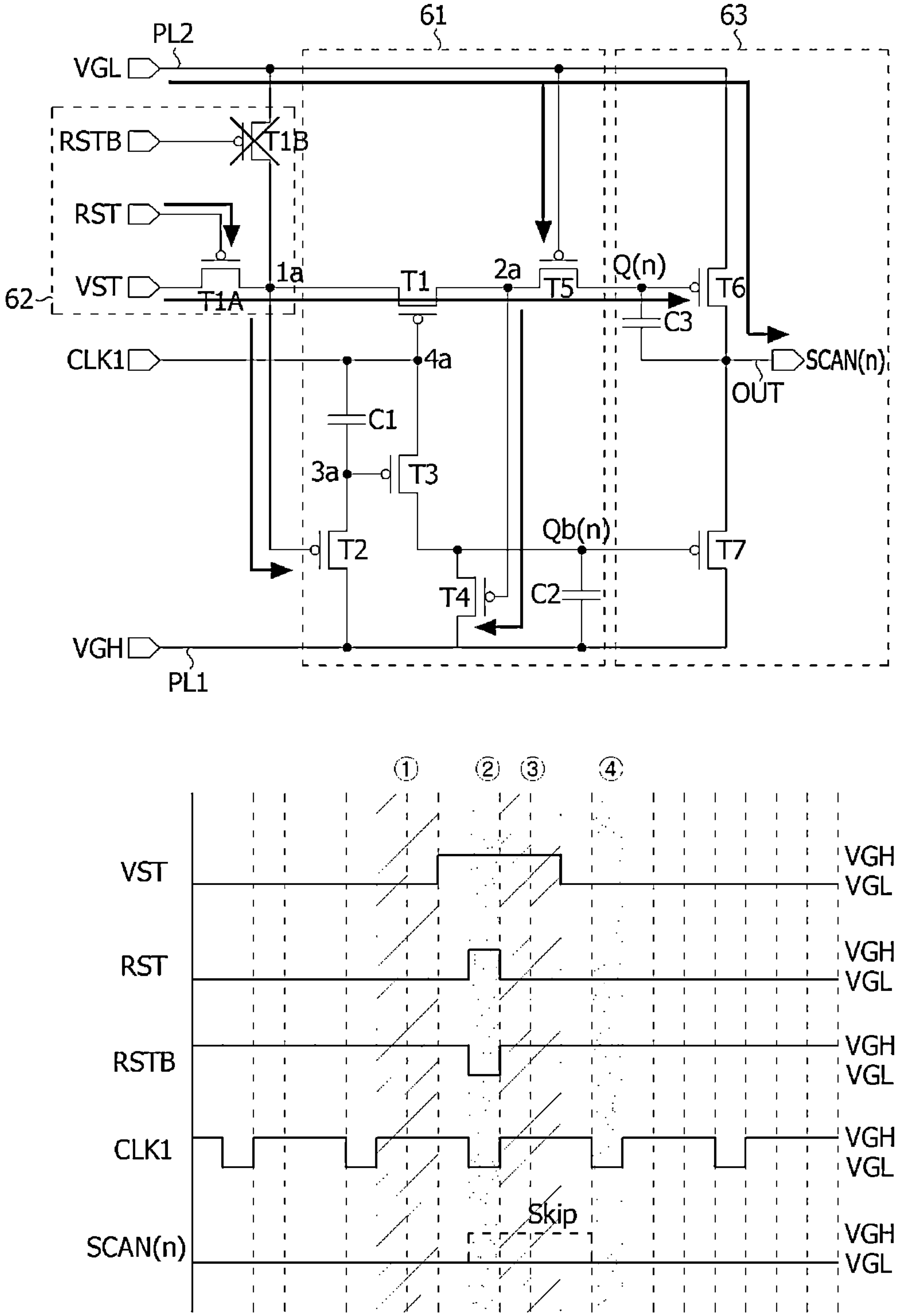
FIG. 9A, FIG. 9B, FIG. 9C and FIG. 9D are diagrams illustrating an operating principle of the gate driver shown in FIG. 7 according to an embodiment of the present disclosure.
Figure 9B:
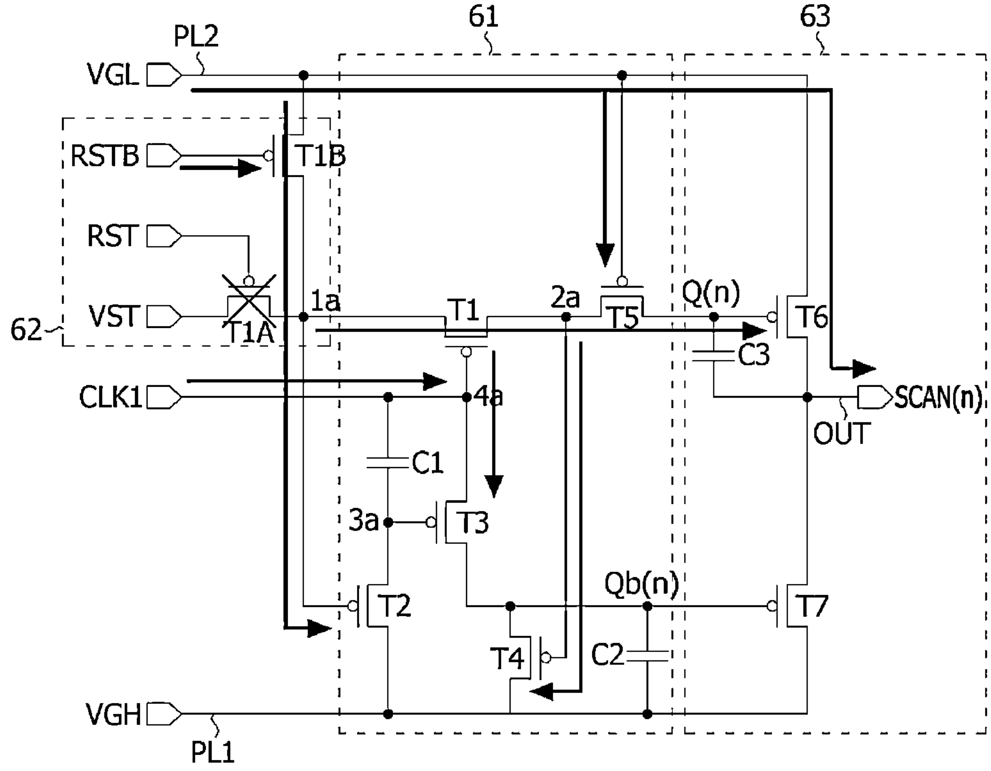
Figure 9B:
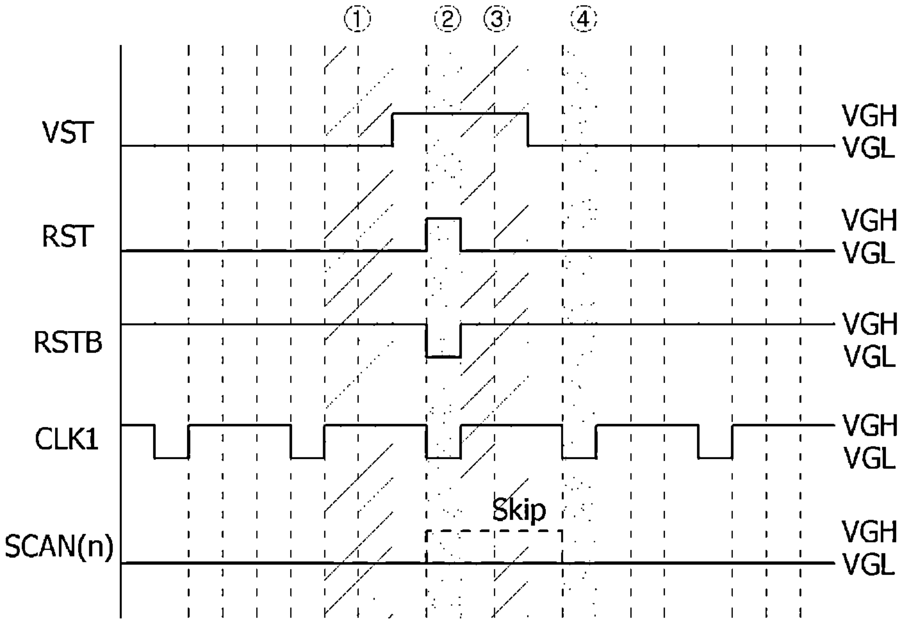
Figure 9C:
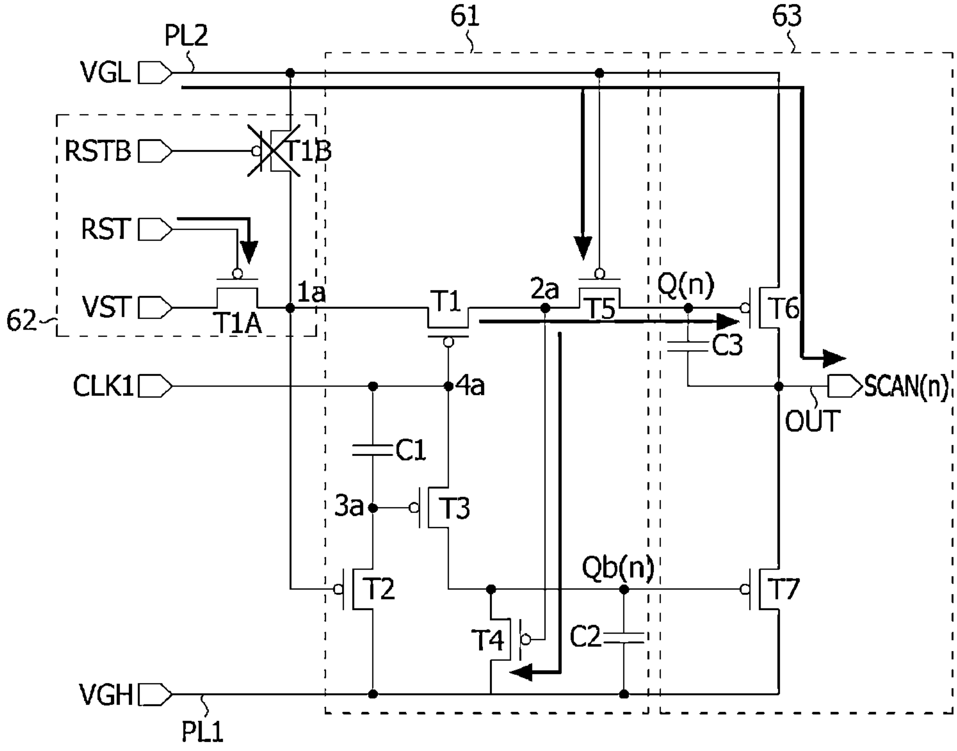
Figure 9C:
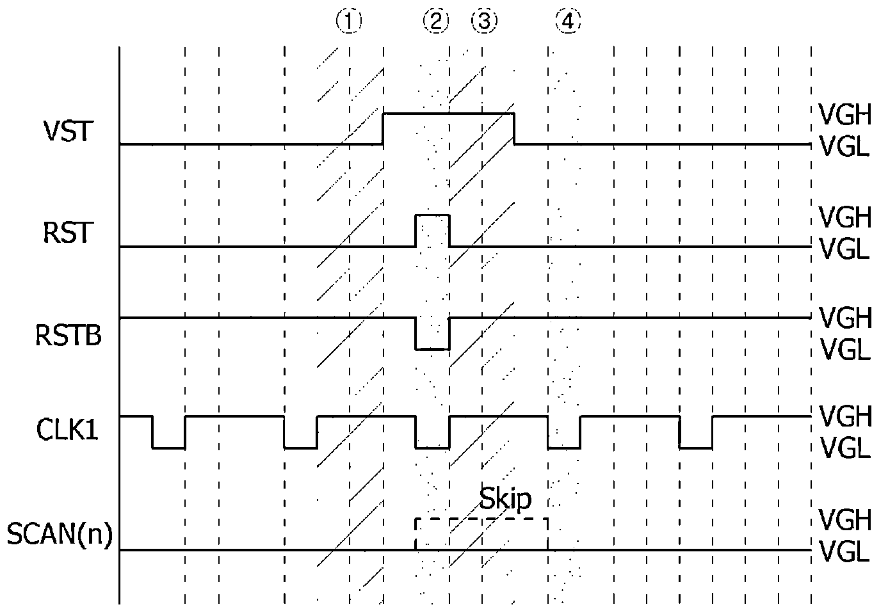
Figure 9D:
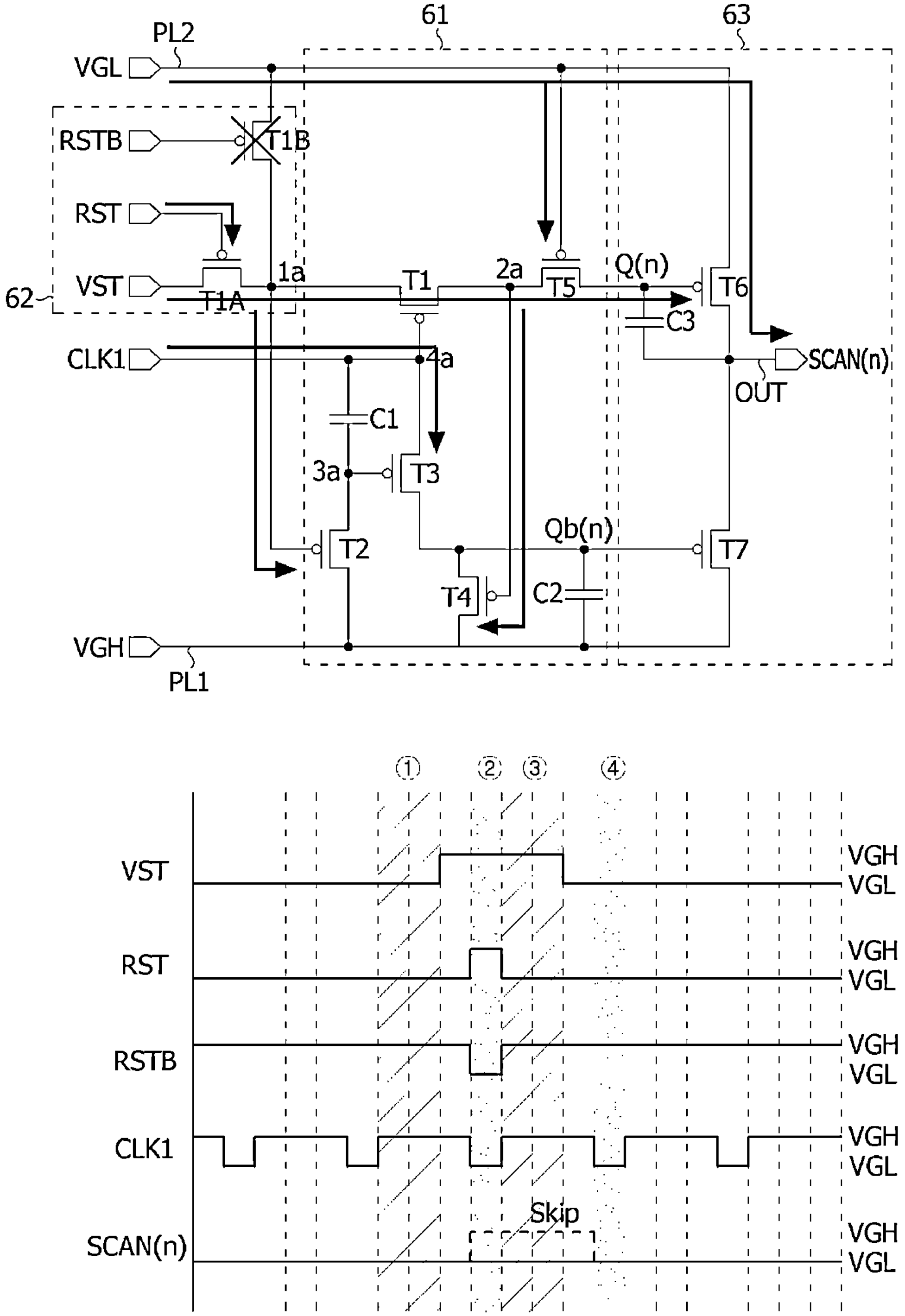

FIG. 7 is a diagram illustrating a gate driver according to a first embodiment. FIG. 8A and FIG. 8B are diagrams illustrating driving waveforms of the gate driver shown in FIG. 7 according to one embodiment. FIG. 9A, FIG. 9B, FIG. 9C and to FIG. 9D are diagrams illustrating an operating principle of the gate driver shown in FIG. 7 according to one embodiment.

Referring to FIG. 7, the gate driver according to the first embodiment of the present disclosure may include a first control node (hereinafter, referred to as a "Q node") at which the output voltage is pulled up, a second control node (hereinafter, referred to as a "Qb node") at which the output voltage is pulled down, a first circuit part 61, a selection portion 62, and a second circuit part 63.

The first circuit part 61 serves to control charging and discharging of the Q node Q(n) and the Qb node Qb(n). The first circuit part 61 may include a first transistor T1, a second transistor T2, a third transistor T3, a fourth transistor T4, a fifth transistor T5, a first capacitor C1, and a second capacitor C2.

The first transistor T1 is turned on by a clock signal CLK1, and connects a first-a node 1*a* to a second-a node 2*a*. The first transistor T1 includes the gate electrode to which the clock signal is applied, the first electrode connected to the first-a node 1*a*, and the second electrode connected to the second-a node 2*a*.

The second transistor T2 is turned on by the start signal VST or the previous carry signal C(n-1), and connects a third-a node 3*a* to a first power line PL1 through which a high potential voltage VGH is applied. The second transistor T2 includes the gate electrode to which the start signal VST or the previous carry signal C(n-1) is applied, the first electrode connected to the third-a node 3*a*, and the second electrode connected to the first power line PL1.

The third transistor T3 is turned on by the voltage of the third-a node 3*a*, and connects a fourth-a node 4*a*, to which the clock signal CLK(n) is applied, to the second control node Qb(n). The third transistor T3 includes the gate electrode connected to the third-a node 3*a*, the first electrode connected to the fourth-a node 4*a*, and the second electrode connected to the second control node Qb(n).

The fourth transistor T4 is turned on by the voltage of the second-a node 2*a*, and connects the second control node Qb(n) to the first power line PL1. The fourth transistor T4 includes the gate electrode connected to the second-a node 2*a*, the first electrode connected to the second control node Qb(n), and the second electrode connected to the first power line PL1.

The fifth transistor T5 is turned on by a low potential voltage VGL and connects the second-a node 2*a* to the first control node Q(n). The fifth transistor T5 includes the gate electrode connected to a second power line PL2 through which the low potential voltage VGL is applied, the first electrode connected to the second-a node 2*a*, and the second electrode connected to the first control node Q(n).

The first capacitor C1 is connected between the third-a node 3*a* and the fourth-a node 4*a*, and the second capacitor C2 is connected between the second control node Qb(n) and the first power line PL1.

The selection portion 62 serves to apply the low potential voltage VGL, instead of the start signal VST or the previous carry signal C(n-1), to the first control node Q(n) in the frame skip interval. The selection portion 62 may include a first-A transistor T1A and a first-B transistor T1B.

The first-A transistor T1A is turned on by a first reset signal RST, and thus the start signal VST or the previous carry signal C(n-1) applied to the first-a node 1*a*. The first-A transistor T1A includes the gate electrode to which the first reset signal RST is applied, the first electrode to which the start signal VST or the previous carry signal C(n-1) is applied, and the second electrode connected to the first-a node 1*a*.

The first-B transistor T1B is turned on by a second reset signal RSTB having an opposite phase to the first reset signal RST, and connects the first-a node 1*a* to the second power line PL2 to supply the low potential voltage VGL. The first-B transistor T1B includes the gate electrode to which the second reset signal RSTB is applied, the first electrode connected to the second power line PL2, and the second electrode connected to the first-a node 1*a*.

The second circuit part 63 may output a scan signal SCAN(n) to an output node OUT based on the potentials of the Q node Q(n) and the Qb node Qb(n). Here, the scan signal SCAN(n) may include the first scan signal SCAN1(n) and the fourth scan signal SCAN4(n) applied to the pixel circuit of FIG. 4. The second circuit part 63 may include a sixth transistor T6 and a seventh transistor T7.

The sixth transistor T6 is turned on by the voltage of the first control node Q(n) and outputs the low potential voltage VGL to the output node OUT. The sixth transistor T6 includes the gate electrode connected to the first control node Q(n), the first electrode connected to the second power line PL2, and the second electrode connected to the output node OUT.

The seventh transistor T7 is turned on by the voltage of the second control node Qb(n) and outputs the high potential voltage VGH to the output node OUT. The seventh transistor T7 includes the gate electrode connected to the second control node Qb(n), the first electrode connected to the output node OUT, and the second electrode connected to the first power line PL1.

A third capacitor C3 is connected between the gate electrode of the sixth transistor T6 and the second electrode thereof.

The gate driver according to an example embodiment may perform the frame skip by the first reset signal RST and the second reset signal RSTB.

In a case where the frame skip is not performed, as shown in FIG. 8A, when the first reset signal RST at a low level is applied to the first-A transistor T1A to turn on the first-A transistor T1A, the start signal VST and the previous carry signal is applied to the first-a node 1*a,* and when the second reset signal RSTB at a high level is applied to the first-B transistor T1B to turn off first-B transistor T1B, the low potential voltage VGL is blocked from being applied to the first-a node 1*a,* and thus the scan signal is outputted at a high level.

In a case where the frame skip is performed, as shown in FIG. 8B, when the first reset signal RST at a high level is applied to the first-A transistor T1A to turn off the first-A transistor T1A, the start signal VST and the previous carry signal are blocked from being applied to the first-a node 1*a,* and when the second reset signal RSTB at a low level is applied to the first-B transistor T1B to turn on the first-B transistor T1B, the low potential voltage VGL is applied to the first-a node 1*a,* and thus the scan signal is outputted at a low level.

Since the gate driver applies the first scan signal and the second scan signal at a low level to the pixel circuit of FIG. 4, the first switch element and the fifth switch element are turned off.

In an example embodiment, the first reset signal RST and the second reset signal RSTB may be applied at different periods depending on the driving frequency. The data driver also does not apply the data voltage according to the first reset signal RST and the second reset signal RSTB in the frame skip interval.

Referring to FIG. 9A, FIG. 9B, FIG. 9C and FIG. 9D, the gate driver according to an example embodiment may operate with a driving waveform divided into a first segment ①, a second segment ②, a third segment ③, and a fourth segment ④.

In the first segment ①, the output signal of the gate driver may be at a gate low voltage since the first reset signal is at a low-level voltage and the second reset signal is at a high-level voltage.

In the second segment ②, the output signal of the gate driver may be at a gate low voltage since the first reset signal is inverted to a high-level voltage and the second reset signal is inverted to a low-level voltage.

In the third segment ③, the output signal of the gate driver may be at a gate low voltage since the voltage of the first control node Q(n) is at a low-level state even though the first reset signal is inverted to a low-level voltage and the second reset signal is inverted to a high-level voltage.

In the fourth segment ④, the output signal of the gate driver may be at a gate low voltage since the first reset signal is at a low-level voltage and the second reset signal is at a high-level voltage.

Accordingly, the gate driver may output the gate low voltage during the first to fourth segments.

Figure 10A:
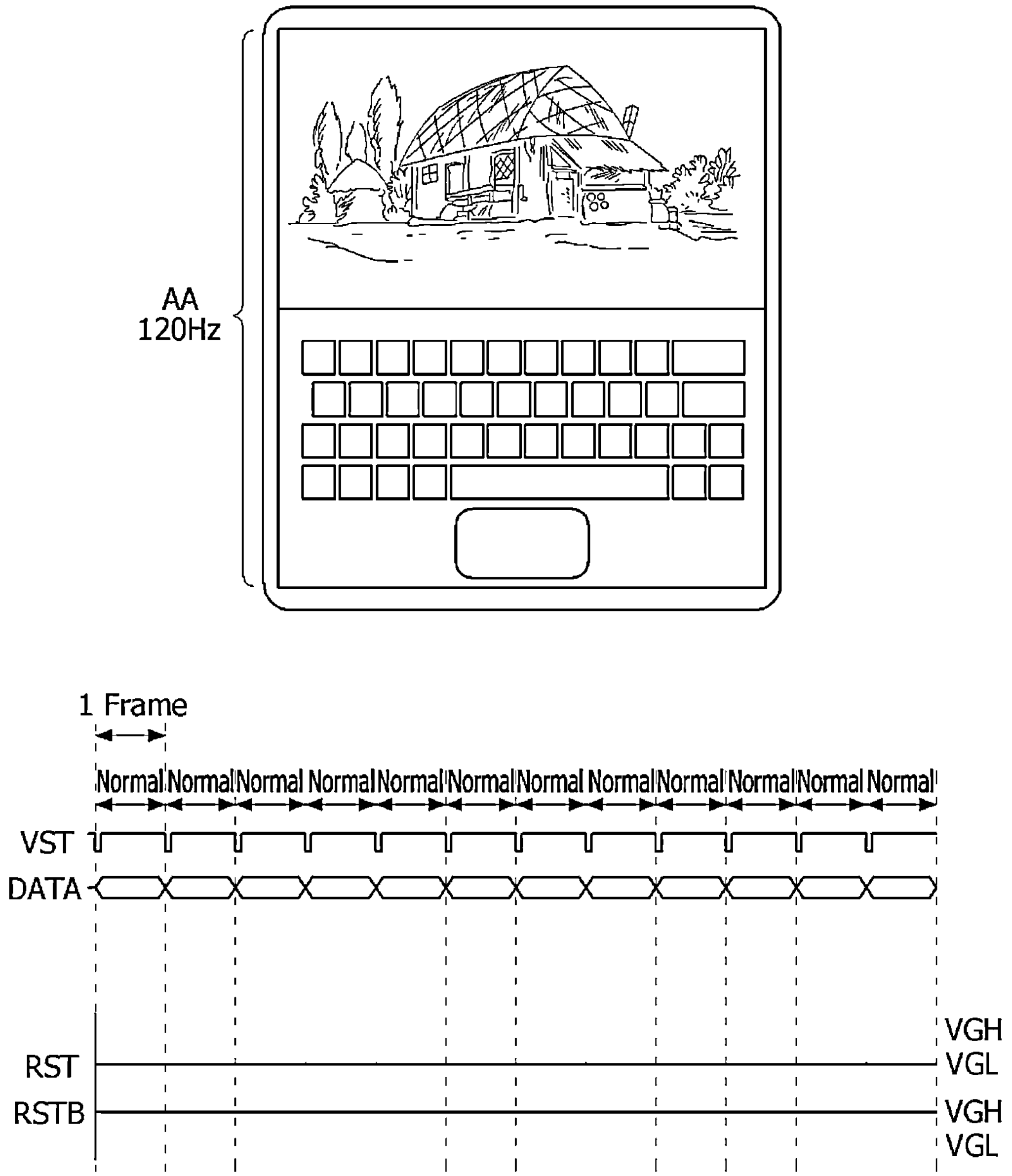
FIG. 10A, FIG. 10B and FIG. 10C are diagrams illustrating a frame skip principle for each frequency according to an embodiment of the present disclosure.
Figure 10B:
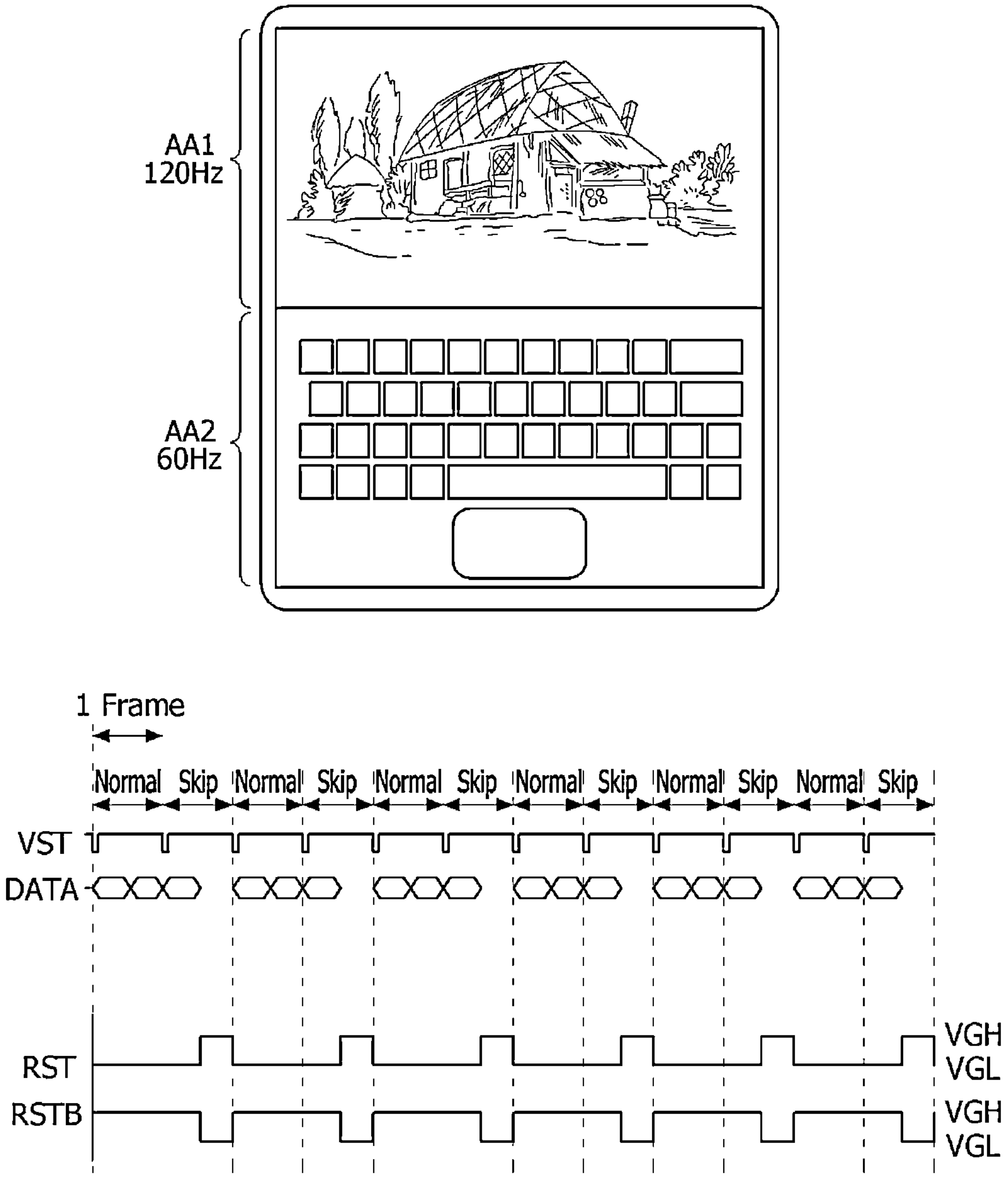
Figure 10C:
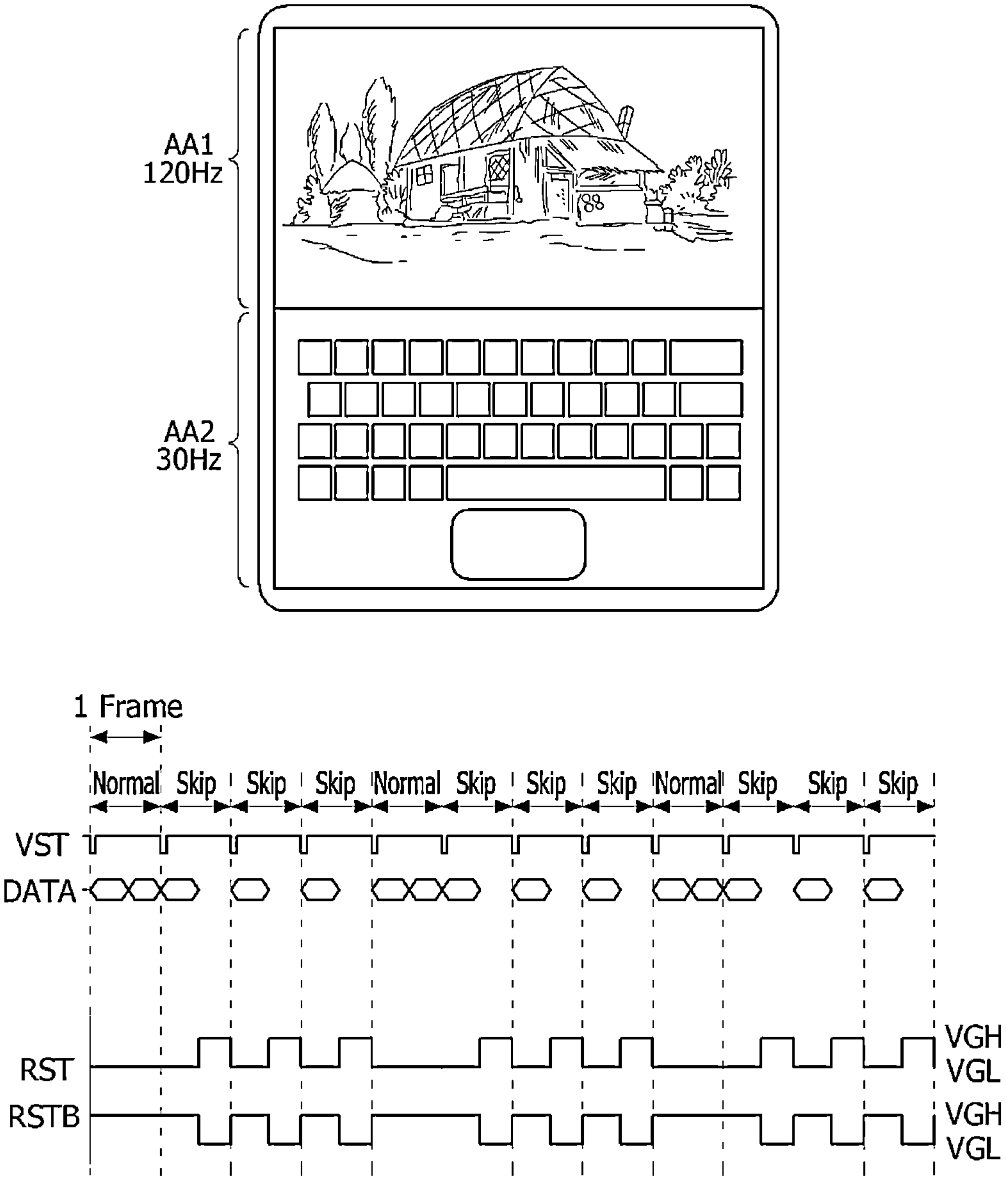

FIG. 10A, FIG. 10B, and FIG. 10C are diagrams illustrating a frame skip principle for each frequency according to one embodiment.

Referring to FIG. 10A, when the entire screen area is driven at a frequency of 120 Hz without performing multi-frequency driving, the data driver applies image data DATA to the entire screen area every frame, and the gate driver sequentially applies the gate signals by the low-level first reset signal RST and the high-level second reset signal RSTB.

Referring to FIG. 10B, when the first area AA1 and the second area AA2 divided for multi-frequency driving are driven at frequencies of 120 Hz and 60 Hz, respectively, the data driver applies the first image data to the first area every frame, applies the second image data to the second area in one frame interval every two frames, and does not apply the second image data in the remaining one frame interval.

In this case, the gate driver also applies the gate signal to the first area every frame, applies the gate signal to the second area in one frame interval every two frames by the first reset signal RST and the second reset signal RSTB, and does not apply the gate signal in the remaining one frame interval.

Referring to FIG. 10C, when the first area AA1 and the second area AA2 divided for multi-frequency driving are driven at frequencies of 120 Hz and 30 Hz, respectively, the data driver applies the first image data to the first area every frame, applies the second image data to the second area in one frame interval every four frames, and does not apply the second image data in the remaining three frame intervals.

In this case, the gate driver also applies the gate signal to the first area every frame, applies the gate signal to the second area in one frame interval every four frames by the first reset signal RST and the second reset signal RSTB, and does not apply the gate signal in the remaining three frame intervals.

Thus, it is possible to operate the divided areas at different driving frequencies by blocking the gate signal applied to the second area during the frame skip interval.

FIG. 11A, FIG. 11B, FIG. 11C, FIG. 11D, and FIG. 11E are diagrams illustrating a principle of generating first and second reset signals according to one embodiment.

Figure 11A:
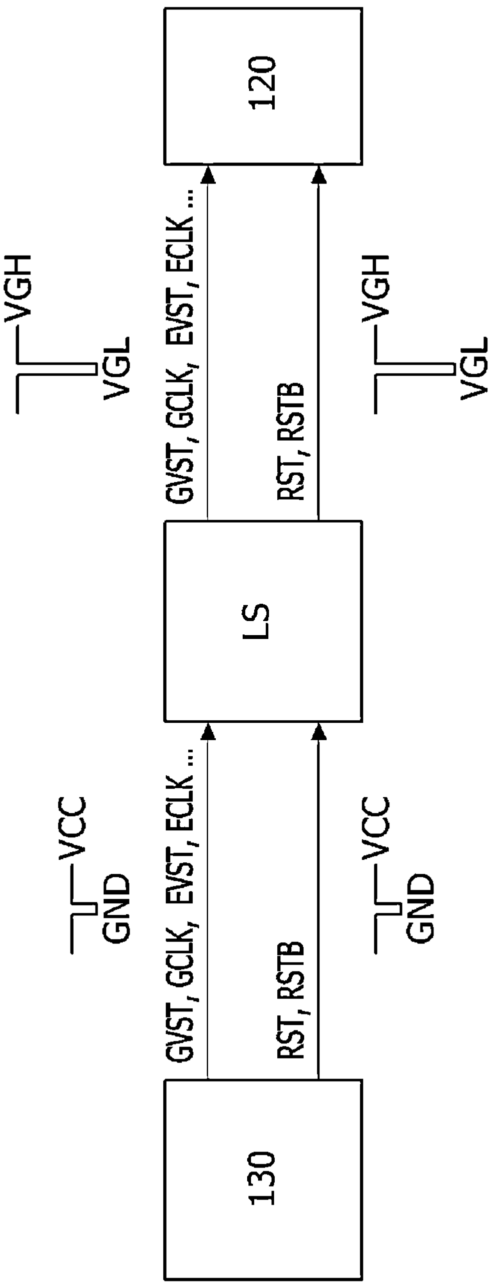
FIG. 11A, FIG. 11B, FIG. 11C, FIG. 11D and FIG. 11E are diagrams illustrating a principle of generating first and second reset signals according to an embodiment of the present disclosure.

Referring to FIG. 11A, in an example embodiment, the first and second reset signals may be generated using one level shifter LS. That is, the timing controller 130 generates the first and second reset signals together with the start signal and the clock signals at a first voltage level VCC and applies them to a level shifter LS. The level shifter LS generates the start signal, the clock signal, and the first and second reset signals from the first voltage level VCC as a second voltage level, i.e., a gate-on voltage VGH and VEH and a gate-off voltage VGL and VEL, and applies them to the gate driver 120 in the display panel.

Figure 11B:
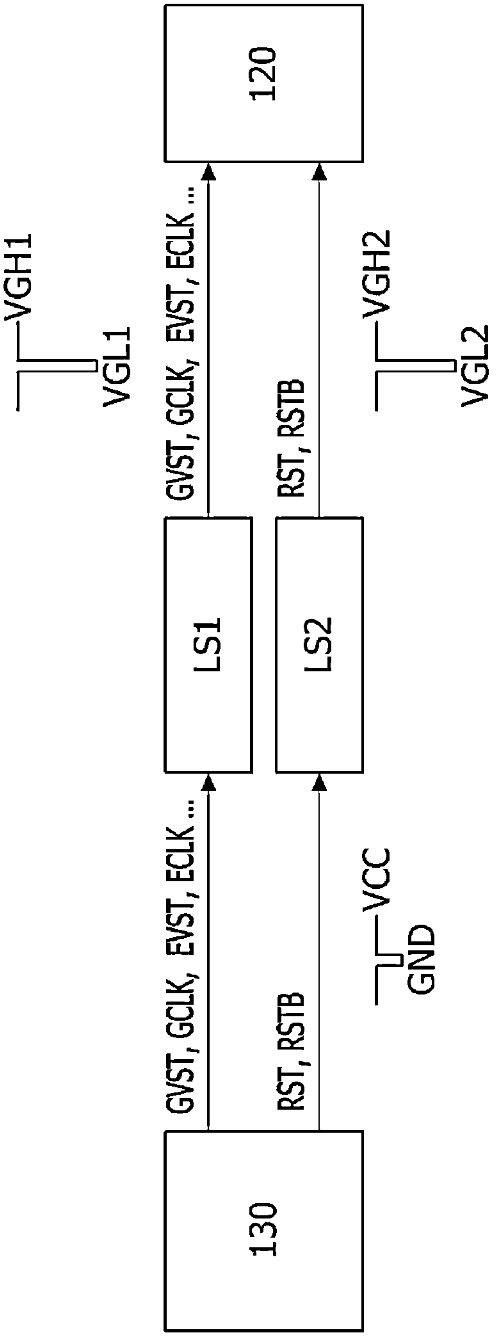

Referring to FIG. 11B, in an embodiment, the first and second reset signals may be generated using a separate level shifter LS2. That is, the timing controller 130 generates the start signal and the clock signal at the first voltage level and applies them to a first level shifter LS1, and at the same time, generates the first and second reset signals at the first voltage level and applies them to a second level shifter LS2.

The first level shifter LS1 converts the start signal and the clock signal from the first voltage level to the second voltage level, i.e., a gate-on voltage VGH1 and VEH1 and a gate-off voltage VGL1 and VEL1 and applies them to the gate driver 120 in the display panel, and at the same time, converts the first and second reset signals from the first voltage level to a third voltage level, i.e., a gate-on voltage VGH2 and VEH2 and a gate-off voltage VGL2 and VEL2, and applies them to the gate driver 120 in the display panel.

As shown in FIG. 11A, the first and second reset signals RST and RSTB are generated to have a same voltage level, by contrast, in FIG. 11B, the first and second reset signals RST and RSTB are generated to have different voltage levels.

The reason for generating the first and second reset signals RST and RSTB with different voltage levels is to apply different gate-on voltages or gate-off voltages of the first and second reset signals RST and RSTB as needed, since the voltage levels of the first and second reset signals RST and RSTB are lowered by the threshold voltage Vth as the signals pass through the transistor in the gate driver.

Figure 11C:
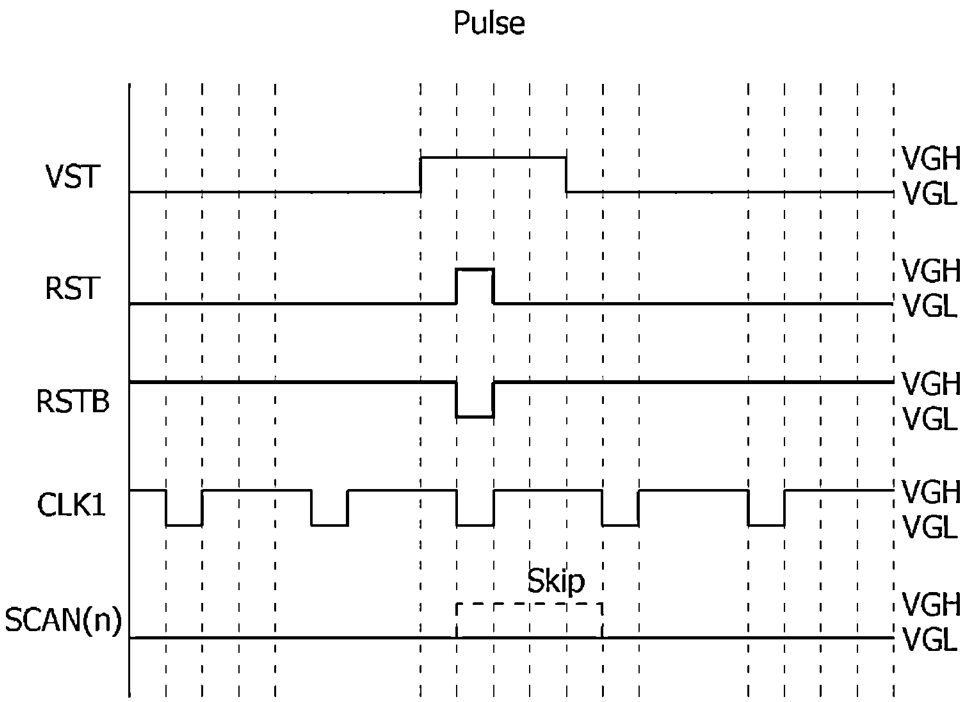
Figure 11D:
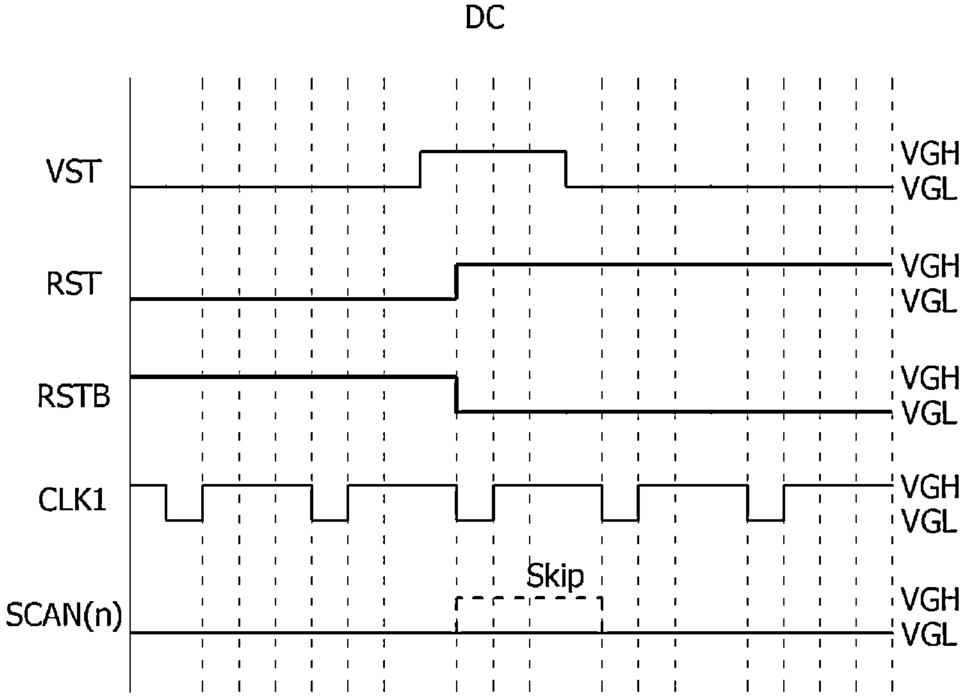
Figure 11E:
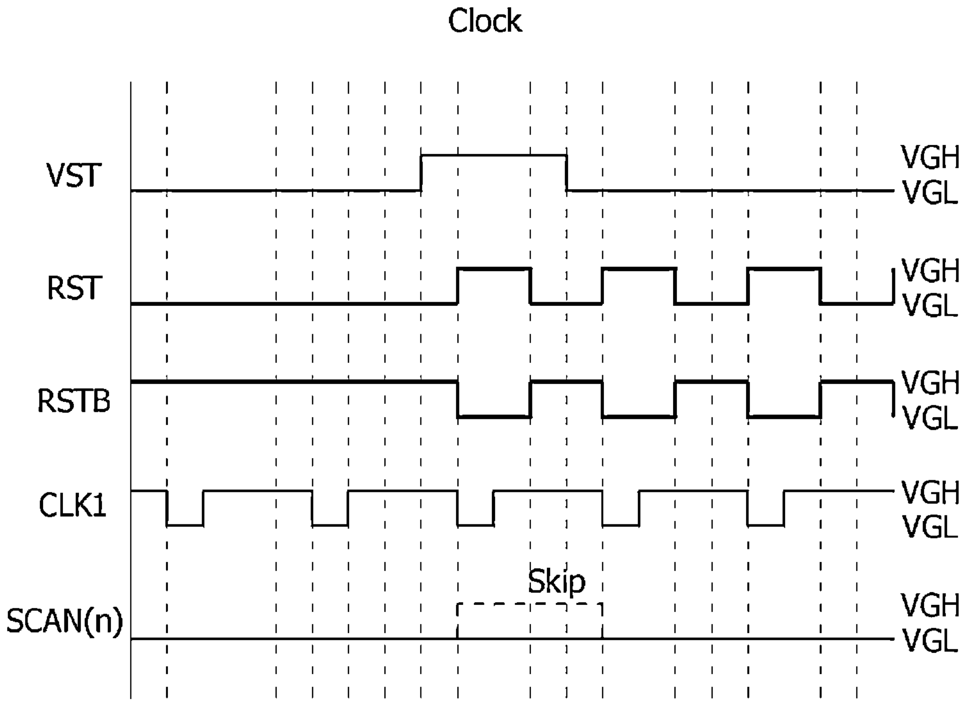

In this case, the first and second reset signals RST and RSTB may be formed in the form of a pulse voltage as shown in FIG. 11C, in the form of a direct current voltage as shown in FIG. 11D, or in the form of a clock voltage as shown in FIG. 11E. However, it is not necessarily limited thereto and may be formed in various forms.

In addition, any signal form capable of blocking the gate-on voltage of the gate signal when the clock signal is at a low level and the start signal is at a high level is possible. In particular, the pulse voltage form or the direct current voltage form is advantageous in power consumption since transition is minimized. In addition, the clock voltage form is advantageous in terms of prevention of deterioration of a buffer transistor since the buffer transistor is alternately driven.

For example, when the first reset signal RST is at a high level, and the second reset signal RSTB is maintained at a low level for at least 1H period, the frame skip is possible.

Figure 12:
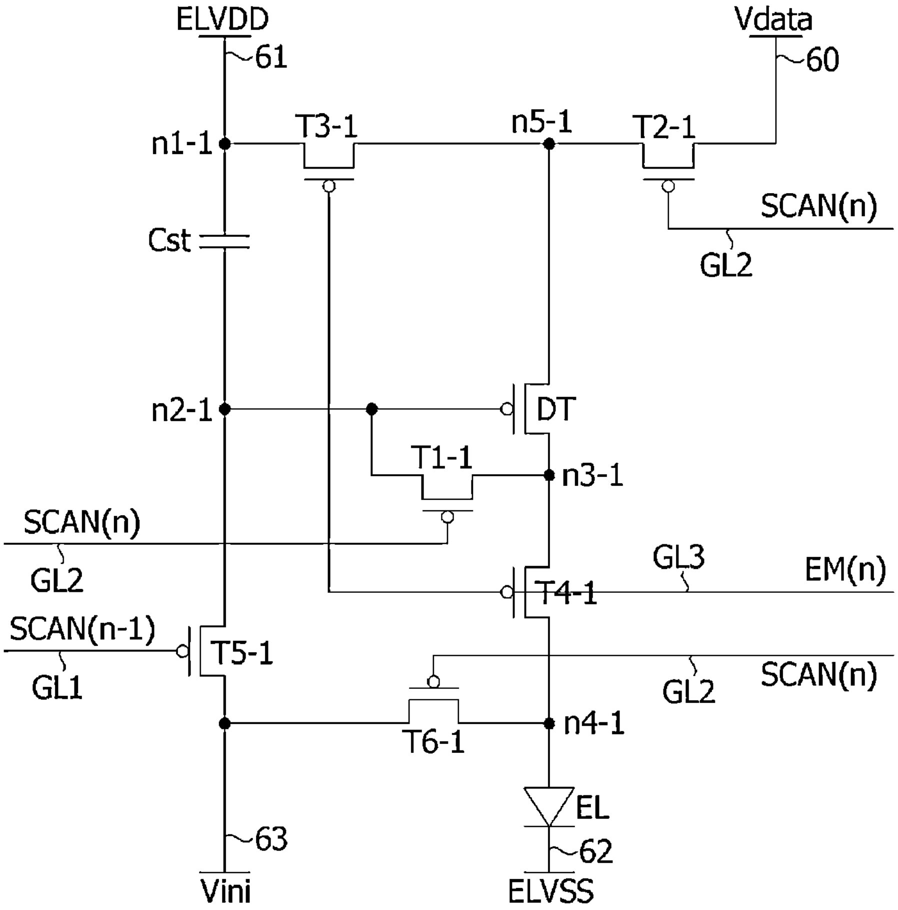
FIG. 12 is a diagram illustrating a pixel circuit according to a second embodiment of the present disclosure.
Figure 13:
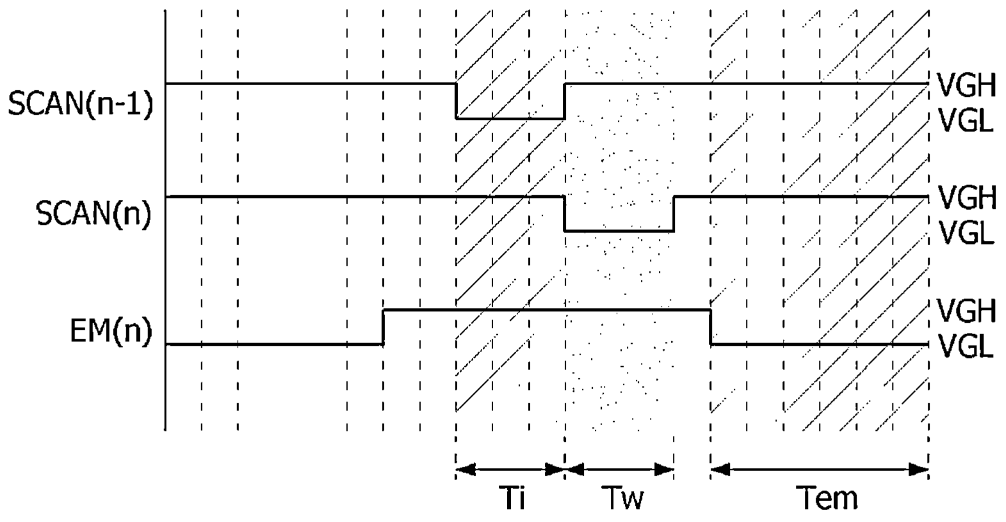
FIG. 13 is a diagram illustrating a driving timing of the pixel circuit shown in FIG. 12 according to an embodiment of the present disclosure.

FIG. 12 is a diagram illustrating a pixel circuit according to a second embodiment of the present disclosure. FIG. 13 is a diagram illustrating a driving timing of the pixel circuit shown in FIG. 12 according to one embodiment.

Referring to FIGS. 12 and 13, the pixel circuit according to a second embodiment of the present disclosure includes a light emitting element EL, a driving element DT for supplying a current to the light emitting element EL, a plurality of switch elements T1-1, T2-1, T3-1, T4-1, T5-1, and T6-1 for switching a current path connected to the driving element DT, and a first capacitor Cst for storing the gate-source voltage of the driving element DT. The driving element DT and the switch elements T1-1, T2-1, T3-1, T4-1, T5-1, and T6-1 may be implemented as P-channel oxide TFTs.

The gate signal applied to the pixel circuit includes an $n^{th}$ scan signal SCAN(n), an $(n-1)^{th}$ scan signal SCAN(n-1), and the EM signal EM(n). Here, N is a natural number.

The capacitor Cst is connected between a first-first node n1-1 and a second-first node n2-1. The pixel driving voltage ELVDD is supplied to the pixel circuit through an ELVDD wire. The first-first node n1-1 is connected to the ELVDD wire, the first electrode of a third-first switch element T3-1, and the first electrode of the capacitor Cst. The second-first node n2-1 is connected to the second electrode of the capacitor Cst, the gate electrode of the driving element DT, the first electrode of a first-first switch element T1-1, and the first electrode of a fifth-first switch element T5-1.

The first-first switch element T1-1 is turned on in response to the gate-on voltage VGL of the $n^{th}$ scan signal SCAN(n) and connects the gate electrode of the driving element DT to the first electrode thereof. The first-first switch element T1-1 includes the gate electrode connected to a second scan line GL2, the first electrode connected to the second-first node n2-1, and the second electrode connected to a third-first node n3-1. The $n^{th}$ scan signal SCAN(n) is supplied to the pixels through the second scan line GL2. The third-first node n3-1 is connected to the second electrode of the driving element DT, the second electrode of the first-first switch element T1-1, and the first electrode of a fourth-first switch element T4-1.

A second-first switch element T2-1 is turned on in response to the gate-on voltage VGL of the $n^{th}$ scan signal SCAN(n) and applies the data voltage Vdata to the first electrode of the driving element DT. The second-first switch element T2-1 includes the gate electrode connected to the second scan line GL2, the first electrode connected to a fifth-first node n5-1, and the second electrode connected to a data line 60. The fifth-first node n5-1 is connected to the first electrode of the driving element DT, the first electrode of the second-first switch element T2-1, and the second electrode of the third-first switch element T3-1.

The third-first switch element T3-1 supplies the pixel driving voltage ELVDD to the first electrode of the driving element DT in response to the EM signal EM(n). The third-first switch element T3-1 includes the gate electrode connected to an EM line GL3, the first electrode connected to the ELVDD wire, and the second electrode connected to the fifth-first node n5-1. The EM signal EM(n) is supplied to the pixels through the EM line GL3.

The fourth-first switch element T4-1 is turned on in response to the gate-on voltage VGL of the EM signal EM(n) and connects the second electrode of the driving element DT to the anode electrode of the light emitting element EL. The gate electrode of the fourth-first switch element T4-1 is connected to the EM line GL3. The first electrode of the fourth-first switch element T4-1 is connected to the third-first node n3-1, and the second electrode of the fourth-first switch element T4-1 is connected to a fourth-first node n4-1. The fourth-first node n4-1 is connected to the anode electrode of the light emitting element EL, the second electrode of the fourth-first switch element T4-1, and the second electrode of a sixth-first switch element T6-1.

The fifth-first switch element T5-1 is turned on in response to the gate-on voltage VGL of the $(n-1)^{th}$ scan signal SCAN(n-1) and connects the second-first node n2-1 to a Vini wire 63 to initialize the capacitor Cst and the gate of the driving element DT during the initialization phase Ti. The fifth-first switch element T5-1 includes the gate electrode connected to a first scan line GL1, the first electrode connected to the second-first node n2-1, and the second electrode connected to the Vini wire 63. The $(n-1)^{th}$ scan signal SCAN(n-1) is supplied to the pixels through the first scan line GL1. The initialization voltage Vini is supplied to the pixels through the Vini wire 63.

The sixth-first switch element T6-1 is turned on in response to the gate-on voltage VGL of the $n^{th}$ scan signal SCAN(n) and connects the Vini wire 63 to the anode electrode of the light emitting element EL. The sixth-first switch element T6-1 includes the gate electrode connected to the second scan line GL2, the first electrode connected to the Vini wire 63, and the second electrode connected to the fourth-first node n4-1.

The driving element DT drives the light emitting element EL by controlling a current flowing through the light emitting element EL based on the gate-source voltage Vgs. The driving element DT includes the gate electrode connected to the second-first node n2-1, the first electrode connected to the fifth-first node n5-1, and the second electrode connected to the third-first node n3-1.

The light emitting element EL is connected between the fourth-first node n4-1 and an ELVSS wire. The light emitting element EL may be implemented as an OLED. The OLED includes an organic compound layer formed between the anode and the cathode. The organic compound layer may include a hole injection layer HIL, a hole transport layer HTL, an emission layer EML, an electron transport layer ETL, and an electron injection layer EIL, but is not limited thereto. When a voltage is applied to the anode and cathode of the OLED, holes that have passed through the hole transport layer HTL and electrons that have passed through the electron transport layer ETL move to the emission layer EML to form excitons, and as a result, visible light is emitted from the emission layer EML.

In the initialization phase Ti, the fifth-first switch element T5-1 is turned on, so that the voltage of the second-first node n2-1 is discharged to the initialization voltage Vini.

In the data writing phase Tw, the first-first switch element T1-1, the second-first switch element T2-1, and the sixth-first switch element T6-1 are turned on, so that the data voltage is applied to the fifth-first node n5-1 and the voltage of the second-first node n2-1 becomes Vdata+Vth. The threshold voltage Vth of the driving element is sensed and charged to the capacitor Cst connected to the second-first node n2-1.

In the emission phase Tem, the third-first switch element T3-1 and the fourth-first switch element T4-1 are turned on, so that a current flows through the driving element DT to the light emitting element EL, causing the light emitting element EL to emit light.

Since the method of implementing the frame skip is to prevent the output of the gate signal, it may be possible to achieve this by preventing the output of the $(n-1)^{th}$ scan signal and the $n^{th}$ scan signal among three signals, i.e., the $(n-1)^{th}$ scan signal, the $n^{th}$ scan signal, and the EM signal, to the pixel circuit of FIG. 12. For example, the first-first switch element T1-1 and the second-first switch element T2-1, the fifth-first switch element T5-1, and the sixth-first switch element T6-1 are turned off such that the voltages of the second-first node n2-1 and the third-first node n3-1 are not initialized at the time of the frame skip. Thus, it is possible to operate the divided areas at different driving frequencies by blocking the gate signal applied to the second area during the frame skip interval.

Figure 14:
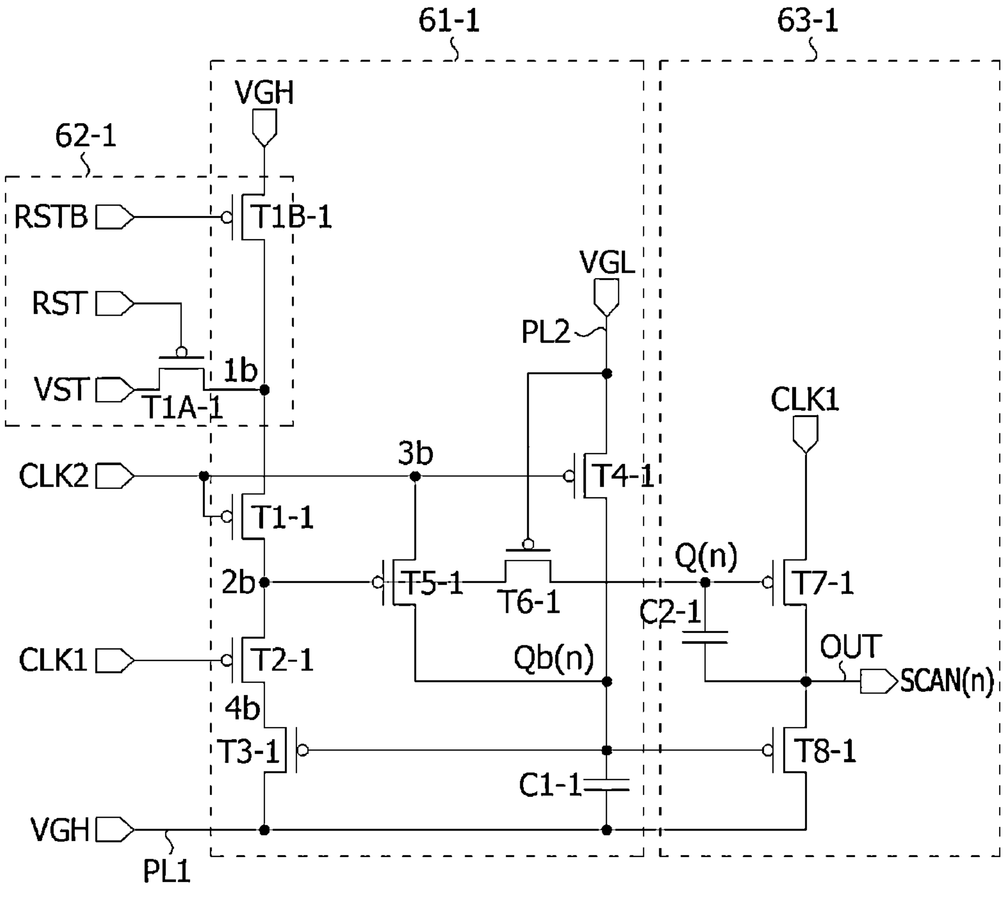
FIG. 14 is a diagram illustrating a gate driver according to a second embodiment.
Figure 15A:
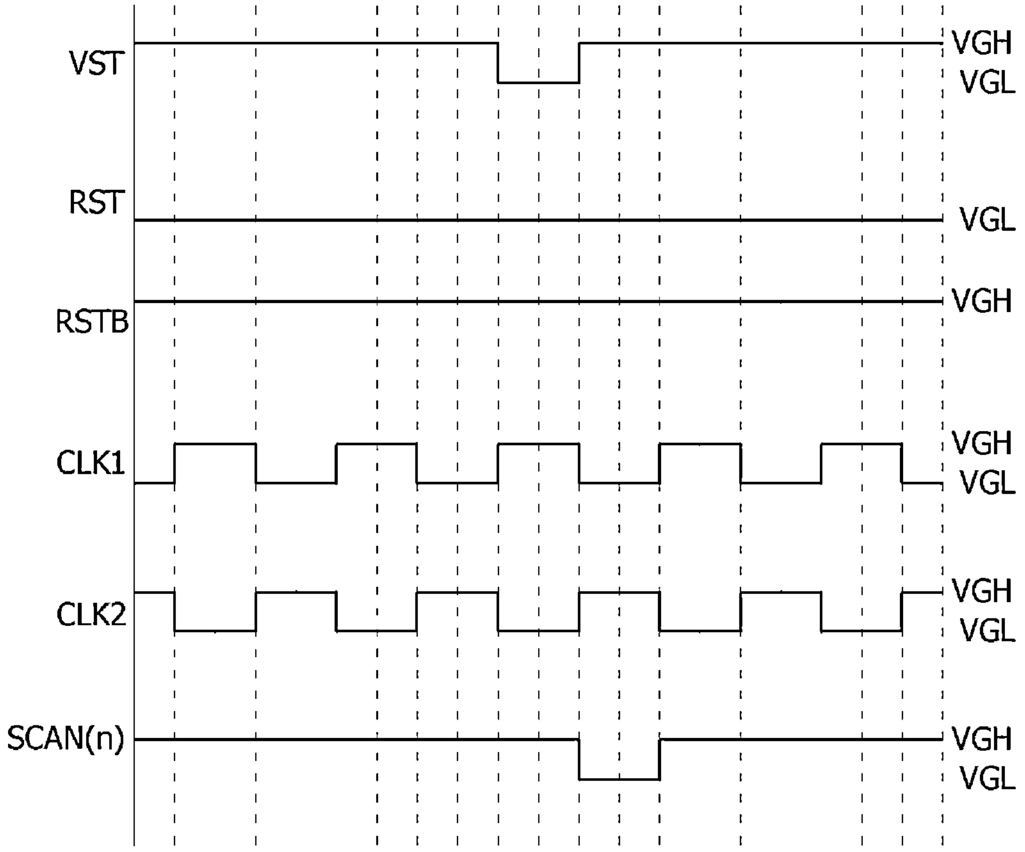
FIG. 15A and FIG. 15B are diagrams illustrating driving waveforms of the gate driver shown in FIG. 14 according to an embodiment of the present disclosure.
Figure 15B:
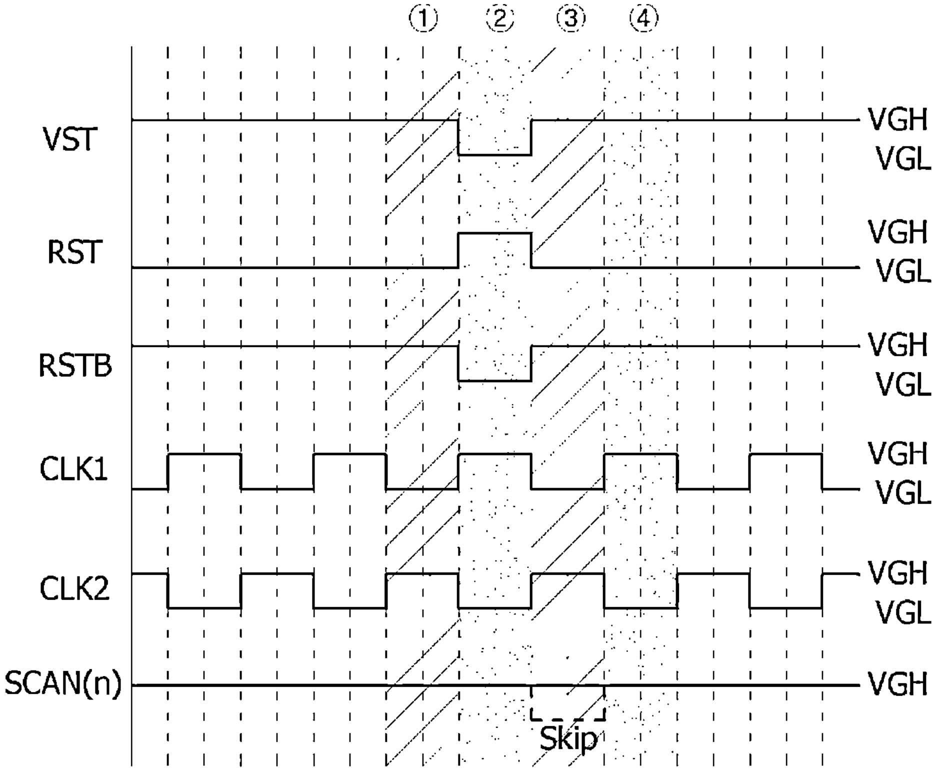
Figure 16A:
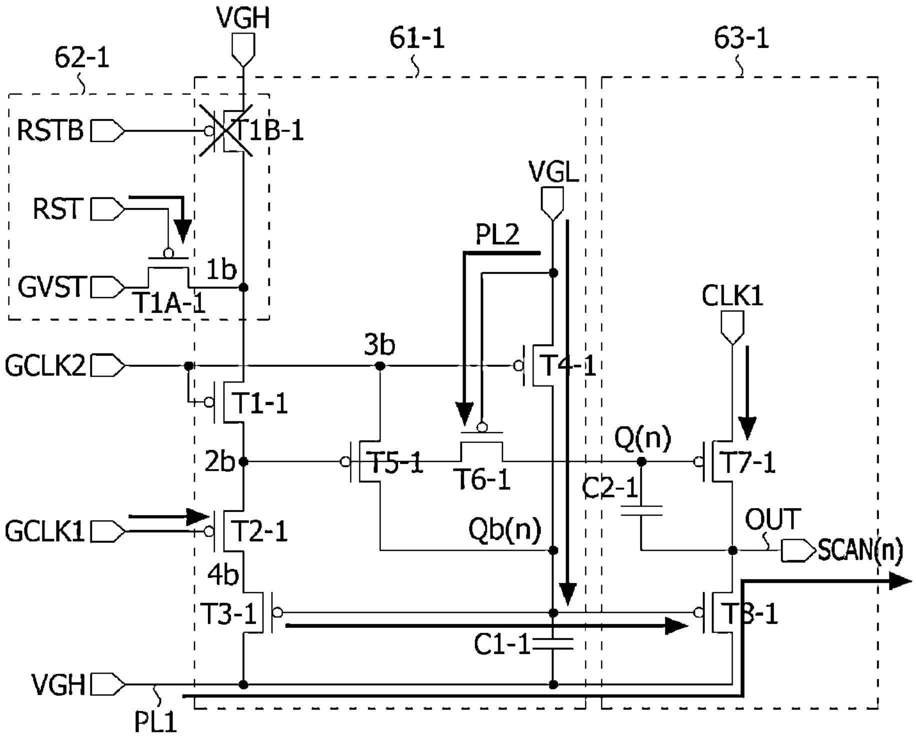
FIG. 16A, FIG. 16B, FIG. 16C and FIG. 16D are diagrams illustrating an operating principle of the gate driver shown in FIG. 14 according to an embodiment of the present disclosure.
Figure 16A:
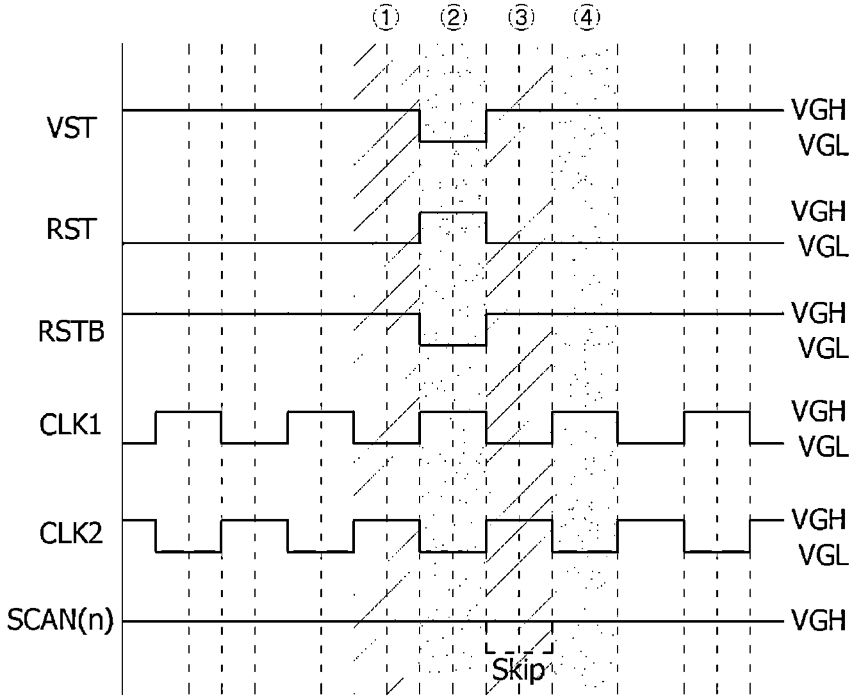
Figure 16B:
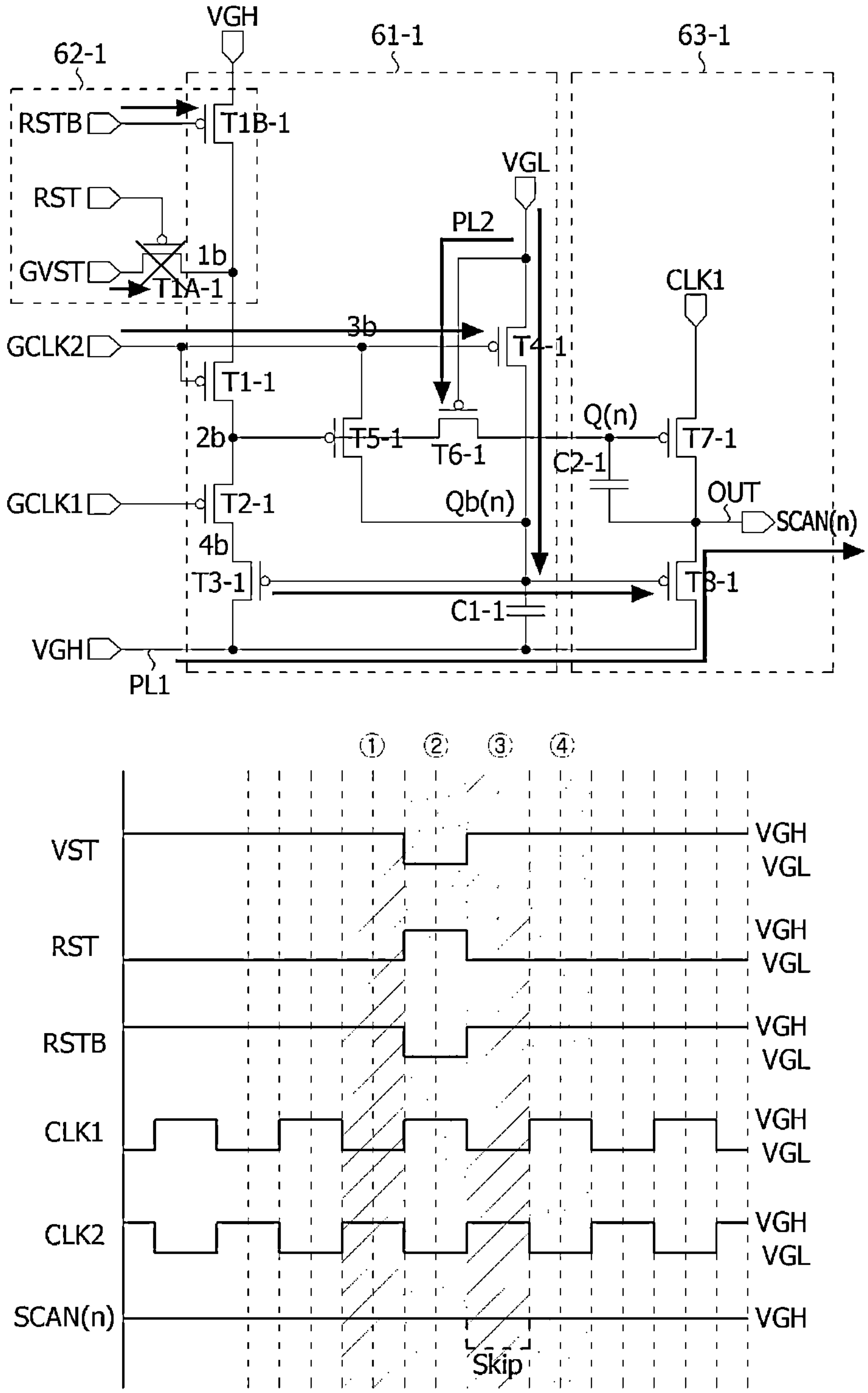
Figure 16C:
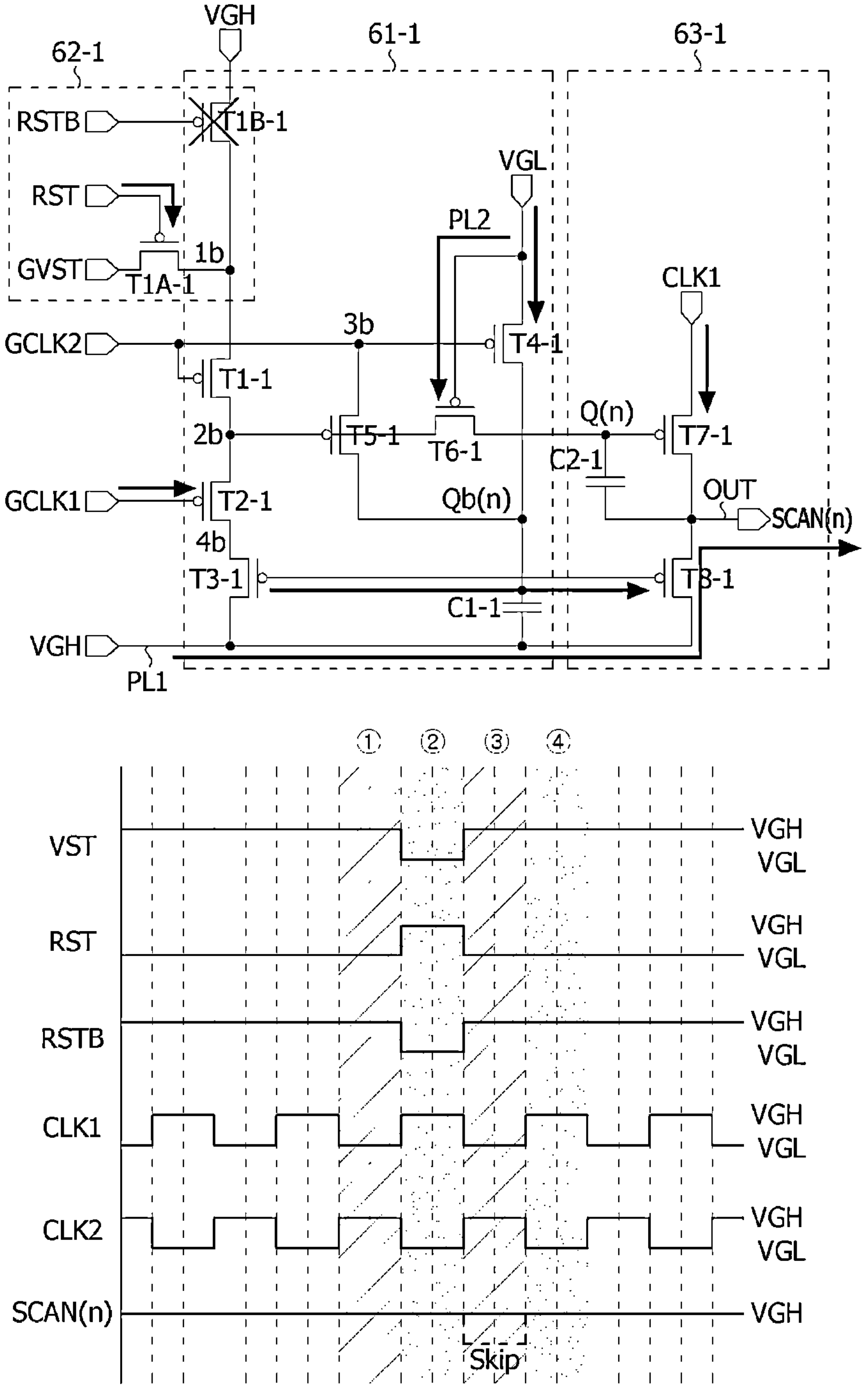
Figure 16D:
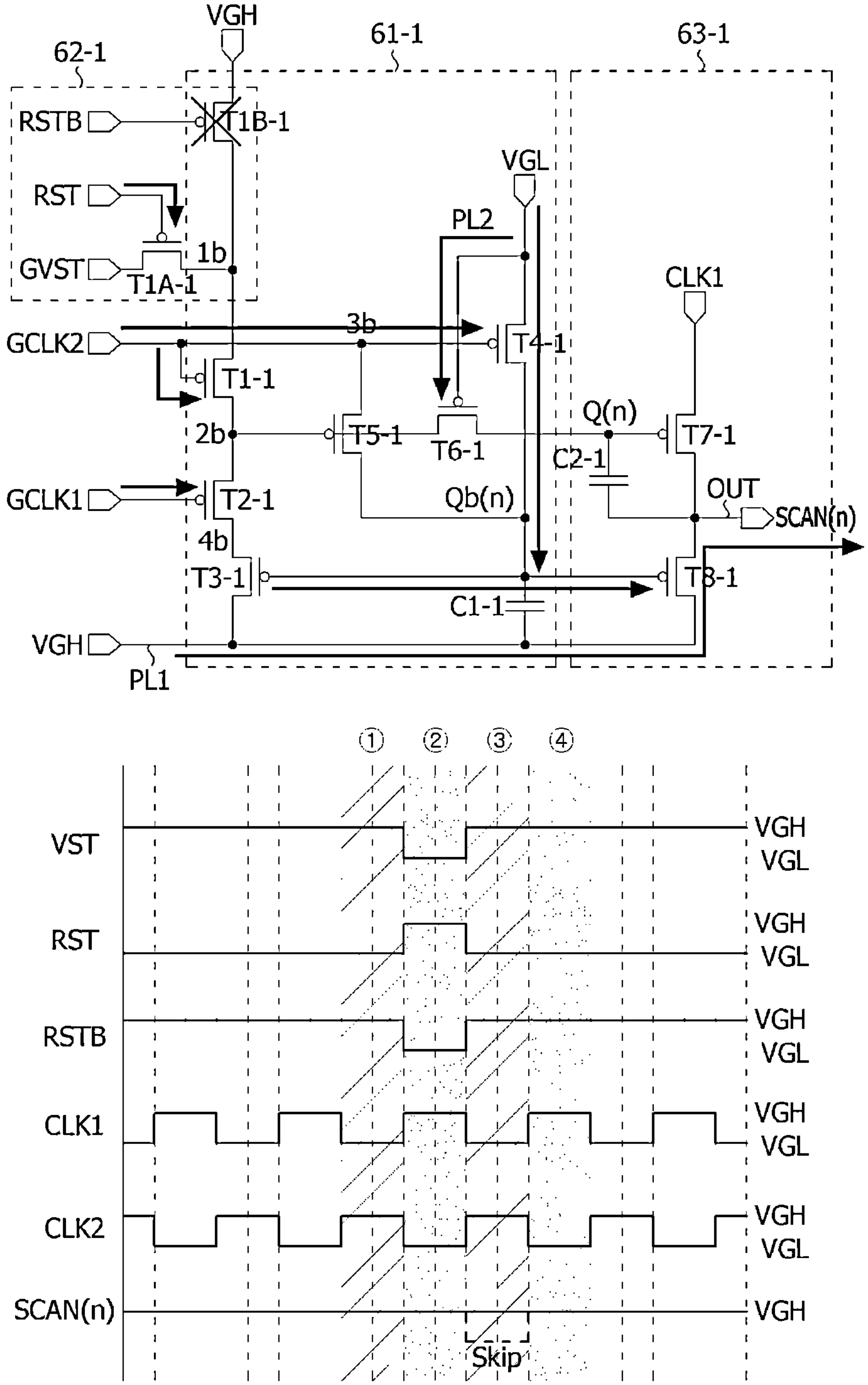

FIG. 14 is a diagram illustrating a gate driver according to a second embodiment. FIGS. 15A and 15B are diagrams illustrating driving waveforms of the gate driver shown in FIG. 14 according to one embodiment. FIG. 16A, FIG. 16B, FIG. 16C and FIG. 16D are diagrams illustrating an operating principle of the gate driver shown in FIG. 14 according to one embodiment.

Referring to FIG. 14, the gate driver according to the second embodiment of the present disclosure may include a first control node (hereinafter referred to as a "Q node") at which the output voltage is pulled up, a second control node (hereinafter referred to as a "Qb node") at which the output voltage is pulled down, a first-first circuit part 61-1, a selection portion 62-1, and a second-first circuit part 63-1.

The first-first circuit part 61-1 serves to control charging and discharging of the Q node Q(n) and the Qb node Qb(n). The first-first circuit part 61-1 may include a first-first transistor T1-1, a second-first transistor T2-1, a third-first transistor T3-1, a fourth-first transistor T4-1, a fifth-first transistor T5-1, a sixth-first transistor T6-1, and a first-first capacitor c1-1.

The first-first transistor T1-1 is turned on by a second clock signal CLK2, and applies the start signal VST to a second-b node 2*b*. The first-first transistor T1-1 includes the gate electrode to which the second clock signal CLK2 is applied, the first electrode connected to a first-b node 1*b*, and the second electrode connected to the second-b node 2*b*.

The second-first transistor T2-1 is turned on by a first clock signal CLK1, and connects the second-b node 2*b* to a fourth-b node 4*b*. The second-first transistor T2-1 includes the gate electrode connected to the first clock signal CLK1, the first electrode connected to the second-b node 2*b*, and the second electrode connected to the fourth-b node 4*b*.

The third-first transistor T3-1 is turned on by the voltage of the second control node Qb(n), and connects the fourth-b node 4*b* to a first power line PL1 through which the high potential voltage VGH is applied. The third-first transistor T3-1 includes the gate electrode connected to the second control node Qb(n), the first electrode connected to the fourth-b node 4*b*, and the second electrode connected to the first power line PL1.

The fourth-first transistor T4-1 is turned on by the second clock signal CLK2 and applies the low potential voltage VGL to the second control node Qb(n). The fourth-first transistor T4-1 includes the gate electrode to which the second clock signal CLK2 is applied, the first electrode connected to a second power line PL2 through which the low potential voltage is applied, and the second electrode connected to the second control node Qb(n).

The fifth-first transistor T5-1 is turned on by the voltage of the second-b node 2*b*, and connects the third-b node 3*b* to the second control node Qb(n). The fifth-first transistor T5-1 includes the gate electrode connected to the second-b node 2*b*, the first electrode connected to the third-b node 3*b*, and the second electrode connected to the second control node Qb(n).

The sixth-first transistor T6-1 is turned on by the low potential voltage VGL, and connects the second-b node 2*b* to the first control node Q(n). The sixth-first transistor T6-1 includes the gate electrode to which the low potential voltage VGL is applied, the first electrode connected to the second-b node 2*b*, and the second electrode connected to the first control node Q(n).

The first-first capacitor c1-1 is connected between the second control node Qb(n) and the first power line PL1.

The selection portion 62-1 serves to apply the high potential voltage VGH, instead of the start signal VST or the previous carry signal C(n-1), to the first control node Q(n) in the frame skip interval. The selection portion 62-1 may include a first-A-first transistor T1A-1 and a first-B-first transistor T1B-1.

The first-A-first transistor T1A-1 is turned on by the first reset signal RST, and thus the start signal VST or the previous carry signal C(n-1) applied to the first-b node 1*b*. The first-A-first transistor T1A-1 includes the gate electrode to which the first reset signal RST is applied, the first electrode to which the start signal VST or the previous carry signal C(n-1) is applied, and the second electrode connected to the first-b node 1*b*.

The first-B-first transistor T1B-1 is turned on by the second reset signal RSTB having an opposite phase to the first reset signal RST, and connects the first-b node 1*b* to the first power line PL1 to supply the high potential voltage VGH. The first-B-first transistor T1B-1 includes the gate electrode to which the second reset signal RSTB is applied, the first electrode connected to the first power line PL1, and the second electrode connected to the first-b node 1*b*.

The second-first circuit part 63-1 may output the scan signal SCAN(n) to an output node OUT based on the potentials of the Q node Q(n) and Qb node Qb(n). Here, the scan signal SCAN(n) may include the $(n-1)^{th}$ scan signal SCAN(n-1) and the $n^{th}$ scan signal SCAN(n) applied to the pixel circuit of FIG. 12. The second-first circuit part 63-1 may include a seventh-first transistor T7-1, an eighth-first transistor T8-1, and a second-first capacitor C2-1.

The seventh-first transistor T7-1 is turned on by the voltage of the first control node Q(n) and outputs the first clock signal CLK1 to the output node OUT. The seventh-first transistor T7-1 includes the gate electrode connected to the first control node Q(n), the first electrode to which the first clock signal CLK1 is applied, and the second electrode connected to the output node OUT.

The eighth-first transistor T8-1 is turned on by the voltage of the second control node Qb(n) and outputs the high potential voltage VGH to the output node OUT. The eighth-first transistor T8-1 includes the gate electrode connected to the second control node Qb(n), the first electrode connected to the output node OUT, and the second electrode connected to the first power line PL1.

The second-first capacitor C2-1 is connected between the gate electrode of the seventh-first transistor T7-1 and the second electrode thereof.

The gate driver according to an example embodiment may perform the frame skip by the reset signals RST and RTSB.

In a case where the frame skip is not performed, as shown in FIG. 15A, when the first reset signal RST at a low level is applied to the first-A-first transistor T1A-1 to turn on the first-A-first transistor T1A-1, the start signal VST and the previous carry signal are applied to the first-b node 1*b*, and when the second reset signal RSTB at a high level is applied to the first-B-first transistor T1B-1 to turn off the first-B-first transistor T1B-1, the low potential voltage is applied to the first-b node 1*b*, and thus the scan signal is outputted at a high level.

In a case where the frame skip is performed, as shown in FIG. 15B, when the first reset signal RST at a high level is applied to the first-A-first transistor T1A-1 to turn off the first-A-first transistor T1A-1, the start signal VST and the previous carry signal are blocked from being applied to the first-b node 1*b*, and when the second reset signal RSTB at a low level is applied to the first-B-first transistor T1B-1 to turn on the first-B-first transistor T1B-1, the low-potential voltage is blocked from being applied to the first-b node 1*b*, and thus the scan signal is outputted at a high level.

Since the $(n-1)^{th}$ scan signal and the $n^{th}$ scan signal are applied at a high level from the gate driver to the pixel circuit of FIG. 12, the first-first switch element and the second-first switch element are turned off.

In an example embodiment, the first reset signal RST and the second reset signal RSTB may be applied at different periods depending on the driving frequency. The data driver also does not apply the data voltage according to the first reset signal RST and the second reset signal RSTB in the frame skip interval.

For example, when the first area AA1 and the second area AA2 divided for multi-frequency driving are driven at frequencies of 120 Hz and 60 Hz, respectively, the gate driver applies the gate signal to the first area every frame, applies the gate signal to the second area in one frame interval every two frames by the first reset signal RST and the second reset signal RSTB, and does not apply the gate signal in the remaining one frame interval.

For example, when the first area AA1 and the second area AA2 divided for multi-frequency driving are driven at frequencies of 120 Hz and 30 Hz, respectively, the gate driver applies the gate signal to the first area every frame, applies the gate signal to the second area in one frame interval every four frames by the first reset signal RST and the second reset signal RSTB, and does not apply the gate signal in the remaining three frame intervals.

Thus, it is possible to operate the divided areas at different driving frequencies by blocking the gate signal applied to the second area during the frame skip interval.

Referring to FIGS. 16A to 16D, the gate driver according to an embodiment operates with a driving waveform divided into a first segment ①, a second segment ②, a third segment ③, and a fourth segment ④.

In the first segment ①, the output signal of the gate driver may be at a gate high voltage since the first reset signal is at a low-level voltage and the second reset signal is at a high-level voltage.

In the second segment ②, the output signal of the gate driver may be at a gate high voltage since the first reset signal is inverted to a high-level voltage and the second reset signal is inverted to a low-level voltage.

In the third segment ③, the output signal of the gate driver may be at a gate high voltage since the voltage of the second control node Qb(n) is at a low-level state even though the first reset signal is inverted to a low-level voltage and the second reset signal is inverted to a high-level voltage.

In the fourth segment ④, the output signal of the gate driver may be at a gate high voltage since the first reset signal is at a low-level voltage and the second reset signal is at a high-level voltage.

Accordingly, the gate driver may output a gate high voltage during the first to fourth segments.

Figure 17:
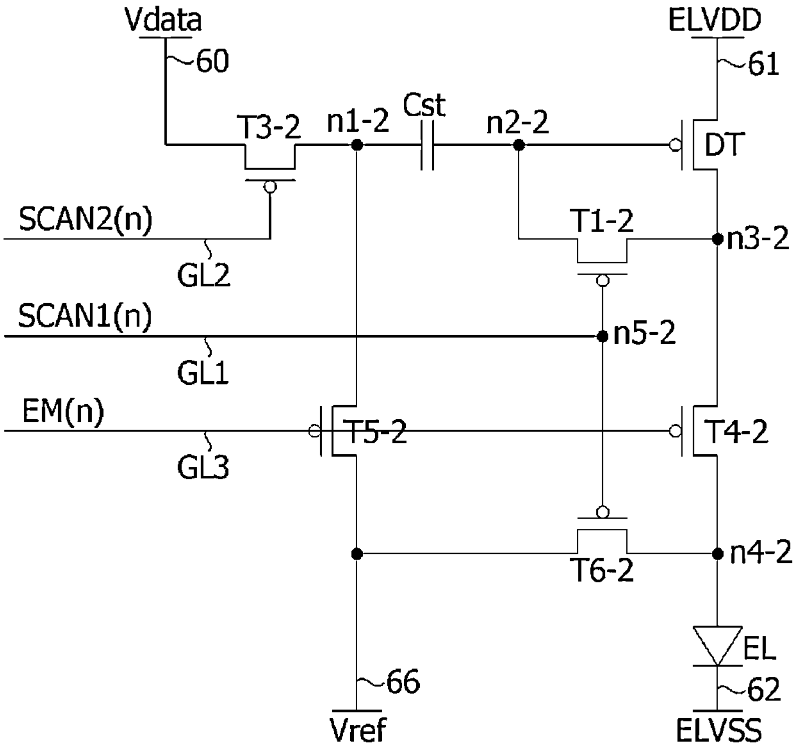
FIG. 17 is a diagram illustrating a pixel circuit according to a third embodiment of the present disclosure.
Figure 18:
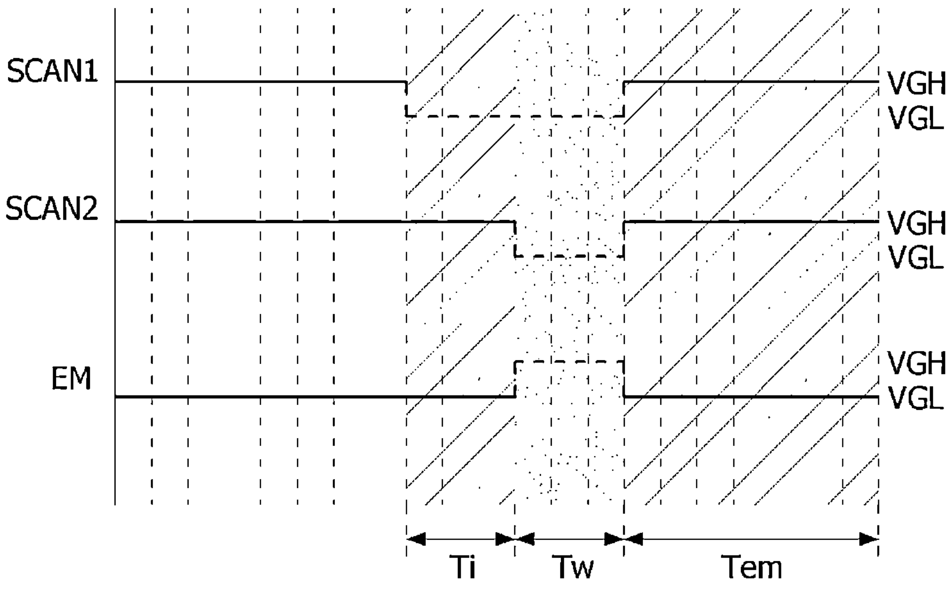
FIG. 18 is a diagram illustrating a driving timing of the pixel circuit shown in FIG. 17.

FIG. 17 is a diagram illustrating a pixel circuit according to a third embodiment of the present disclosure. FIG. 18 is a diagram illustrating a driving timing of the pixel circuit shown in FIG. 17 according to one embodiment.

Referring to FIGS. 17 and 18, the pixel circuit according to a third embodiment of the present disclosure includes a light emitting element EL, a driving element DT for supplying a current to the light emitting element EL, a plurality of switch elements T1-2, T3-2, T4-2, T5-2, and T6-2 for switching a current path connected to the driving element DT, and a first capacitor Cst for storing the gate-source voltage of the driving element DT. The driving element DT and the switch elements T1-2, T3-2, T4-2, T5-2, and T6-2 may be implemented as P-channel oxide TFTs.

The gate signal applied to this pixel circuit includes a first scan signal SCAN1(n), a second scan signal SCAN2(n), and an EM signal EM(n). Here N is a natural number.

The capacitor Cst is connected between a first-second node n1-2 and a second-second node n2-2. The first-second node n1-2 is connected to the second electrode of a third-second switch element T3-2, the first electrode of a fifth-second switch element T5-2, and the first electrode of the capacitor Cst. The second-second node n2-2 is connected to the second electrode of the capacitor Cst, the gate electrode of the driving element DT, and the first electrode of a first-second switch element T1-2.

The first-second switch element T1-2 is turned on in response to the gate-on voltage VGL of the first scan signal SCAN1(n) and connects the gate electrode of the driving element DT to the second electrode thereof. The first-second switch element T1-2 includes the gate electrode connected to a first scan line GL1, the first electrode connected to the second-second node n2-2, and the second electrode connected to a third-second node n3-2. The first scan signal SCAN1(n) is supplied to the pixels through the first scan line GL1. The third-second node n3-2 is connected to the second electrode of the driving element DT, the second electrode of the first-second switch element T1-2, and the first electrode of a fourth-second switch element T4-2.

The third-second switch element T3-2 is turned on in response to the gate-on voltage VGL of the second scan signal SCAN2(n) and applies the data voltage Vdata to the first-second node n1-2. The third-second switch element T3-2 includes the gate electrode connected to a second scan line GL2, the first electrode connected to a data line 60, and the second electrode connected to the first-second node n1-2.

The fourth-second switch element T4-2 is turned on in response to the gate-on voltage VGL of the EM signal EM(n) and connects the second electrode of the driving element DT to the anode electrode of the light emitting element EL. The gate electrode of the fourth-second switch element T4-2 is connected to an EM line GL3. The first electrode of the fourth-second switch element T4-2 is connected to the third-second node n3-2, and the second electrode of the fourth-second switch element T4-2 is connected to a fourth-second node n4-2. The fourth-second node n4-2 is connected to the anode electrode of the light emitting element EL, the second electrode of the fourth-second switch element T4-2, and the second electrode of a sixth-second switch element T6-2.

The fifth-second switch element T5-2 is turned on in response to the gate-on voltage VGL of the EM signal EM(n) and connects the first-second node n1-2 to a Vref wire 66. The fifth-second switch element T5-2 includes the gate electrode connected to the EM line GL3, the first electrode connected to the first-second node n1-2, and the second electrode connected to the Vref wire 66. A reference voltage Vref is supplied to the pixels through the Vref wire 66.

The sixth-second switch element T6-2 is turned on in response to the gate-on voltage VGL of the first scan signal SCAN1(n) and connects the Vref wire 66 to the anode electrode of the light emitting element EL. The sixth-second switch element T6-2 includes the gate electrode connected to the first scan line GL1, the first electrode connected to the Vref wire 66, and the second electrode connected to the fourth-second node n4-2.

In the initialization phase Ti, the first-second switch element T1-2, the fourth-second switch element T4-2, the fifth-second switch element T5-2, and the sixth-second switch element T6-2 are turned on, so that the voltages at the first-second node n1-2 and the fourth-second node n4-2 are discharged to the reference voltage Vref.

In the data writing phase Tw, the first-second switch element T1-2, the third-second switch element T3-2, and the sixth-second switch element T6-2 are turned on, so that the data voltage is applied to the first-second node n1-2 and the voltage at the second-second node n2-2 becomes Vref−Vdata+ELVDD+Vth. The threshold voltage Vth of the driving element is sensed and charged to the capacitor Cst connected to the second-second node n2-2.

In the emission phase Tem, the fourth-second switch element T4-2 and the fifth-second switch element T5-2 are turned on, so that a current flows to the light emitting element EL through the driving element DT, causing the light emitting element EL to emit light.

Since the method of implementing the frame skip is to prevent the output of the gate signal, it may be possible to achieve this by preventing the output of all three signals, i.e., the first and second scan signals and the EM signal, to the pixel circuit of FIG. 17. For example, the first-second switch element T1-2, the third-second switch element T3-2, and the sixth-second switch element T6-2 are turned off such that the voltages at the second-second node n2-2 and the third-second node n3-2 are not initialized at the time of the frame skip.

In this case, the gate driver that outputs the first to second scan signals may be implemented as the circuit of FIG. 7, and the gate driver that outputs the EM signal may be implemented as the circuit of FIG. 14.

Depending on the structure of the pixel circuit and whether the PMOS/NMOS transistor is used, it may be necessary to apply the circuit of FIG. 7, the circuit of FIG. 14, or both the circuits of FIGS. 7 and 14. Since the gate driver of all current display devices is composed of a combination of the circuits of FIGS. 7 and 14, when the gate driver proposed by the present disclosure is applied, the frame skip may be possible regardless of the structure of the pixel circuit and whether the PMOS/NMOS transistor is used.

The example embodiments of the present disclosure can also be described as follows:

According to example embodiments of the present disclosure, a gate driver comprises: a plurality of signal transmitters dependently connected via a carry line through which a carry signal is applied from a previous signal transmitter, wherein an $n^{th}$ signal transmitter includes: a first circuit part configured to receive the carry signal from the previous signal transmitter and charge or discharge a first control node and a second control node; a second circuit part configured to output a gate signal based on voltages at the first control node and the second control node; and a selection portion configured to invert a voltage applied to a first node during a frame skip interval of a partial area in a pixel array driven at a predetermined frame frequency, and charge the first control node with a voltage of the first node, wherein n is a positive integer.

The selection portion serves to apply a low potential voltage to the first control node during the frame skip interval.

The selection portion includes a first-A transistor and a first-B transistor, the first-A transistor includes a gate electrode to which a first reset signal is applied, a first electrode to which a start signal or the carry signal is applied, and a second electrode connected to the first node, and the first-B transistor includes a gate electrode to which a second reset signal having an opposite phase to the first reset signal is applied, a first electrode connected to a second power line through which a low potential voltage is applied, and a second electrode connected to the first node.

The first-A transistor is turned on by the first reset signal, such that the start signal or the carry signal is applied to the first node, and the first-B transistor is turned on by the second reset signal, and connects the first node to the second power line to supply the low potential voltage.

The first and second reset signals are applied in the form of a pulse voltage, a direct current voltage, or a clock voltage.

The first circuit part includes a first transistor, a second transistor, a third transistor, a fourth transistor, a fifth transistor, a first capacitor, and a second capacitor, the first transistor includes a gate electrode connected to a fourth node to which a clock signal is applied, a first electrode connected to the first node, and a second electrode connected to a second node, the second transistor includes a gate electrode connected to the first node, a first electrode connected to a third node, and a second electrode connected to a first power line through which a high potential voltage is applied, the third transistor includes a gate electrode connected to the third node, a first electrode connected to the fourth node, and a second electrode connected to the second control node, the fourth transistor includes a gate electrode connected to the second node, a first electrode connected to the second control node, and a second electrode connected to the first power line, the fifth transistor includes a gate electrode connected to the second power line, a first electrode connected to the second node, and a second electrode connected to the first control node, the first capacitor is connected between the third node and the fourth node, and the second capacitor is connected between the second control node and the first power line.

The second circuit part includes a sixth transistor, a seventh transistor, and a third capacitor, the sixth transistor includes a gate electrode connected to the first control node, a first electrode connected to the second power line, and a second electrode connected to an output node, the seventh transistor includes a gate electrode connected to the second control node, a first electrode connected to the output node, and a second electrode connected to the first power line, and the third capacitor is connected between the gate electrode of the sixth transistor and the second electrode of the sixth transistor.

The selection portion serves to apply a high potential voltage to the first control node during the frame skip interval.

The selection portion includes a first-A transistor and a first-B transistor, the first-A transistor includes a gate electrode to which a first reset signal is applied, a first electrode to which a start signal or the carry signal is applied, and a second electrode connected to the first node, the first-B transistor includes a gate electrode to which a second reset signal having an opposite phase to the first reset signal is applied, a first electrode connected to a first power line through which a high potential voltage is applied, and a second electrode connected to the first node.

The first-A transistor is turned on by the first reset signal, such that the start signal or the carry signal are applied to the first node, and the first-B transistor is turned on by the second reset signal, and connects the first node to the first power line to supply the high potential voltage.

The first circuit part includes a first transistor, a second transistor, a third transistor, a fourth transistor, a fifth transistor, a sixth transistor, and a first capacitor, the first transistor includes a gate electrode connected to a third node to which a second clock signal is applied, a first electrode connected to the first node, and a second electrode connected to a second node, the second transistor includes a gate electrode to which a first clock signal is applied, a first electrode connected to the second node, and a second electrode connected to a fourth node, the third transistor includes a gate electrode connected to the second control node, a first electrode connected to the fourth node, and a second electrode connected to the first power line, the fourth transistor includes a gate electrode connected to the third node, a first electrode connected to a second power line, and a second electrode connected to the second control node, the fifth transistor includes a gate electrode connected to the second node, a first electrode connected to the third node, and a second electrode connected to the second control node, the sixth transistor includes a gate electrode connected to the second power line, a first electrode connected to the second node, and a second electrode connected to the first control node, and the first capacitor is connected between the second control node and the first power line.

The second circuit part includes a seventh transistor, an eighth transistor, and a second capacitor, the seventh transistor includes a gate electrode connected to the first control node, a first electrode to which the first clock signal is applied, and a second electrode connected to an output node, the eighth transistor includes a gate electrode connected to the second control node, a first electrode connected to the output node, and a second electrode connected to the first power line, and the second capacitor is connected between the gate electrode of the seventh transistor and the second electrode of the seventh transistor.

According to example embodiments of the present disclosure, a display device comprises: a pixel array in which a plurality of data lines, a plurality of gate lines, and a plurality of pixel circuits are disposed; and a gate driver configured to output a gate signal to the plurality of gate lines, wherein the pixel array includes a first pixel array driven at a first frame frequency, and a second pixel array driven at a second frame frequency lower than the first frame frequency, and wherein the gate driver outputs the gate signal as a gate-off voltage during a frame skip interval of the second pixel array.

The display device further comprises a data driver configured to output a data voltage to the plurality of data lines, wherein the data driver does not output the data voltage during the frame skip interval.

The first pixel array and the second pixel array share the plurality of data lines with each other, but do not share the plurality of gate lines with each other.

The display device further comprises a timing controller configured to output a timing control signal for controlling the data driver and the gate driver according to the first and second frame frequencies.

Although the example embodiments of the present disclosure have been described in more detail with reference to the accompanying drawings, the present disclosure is not limited thereto and may be embodied in many different forms without departing from the technical concept of the present disclosure. Therefore, the example embodiments disclosed in the present disclosure are provided for illustrative purposes only and are not intended to limit the technical concept of the present disclosure. The scope of the technical concept of the present disclosure is not limited thereto. Therefore, it should be understood that the above-described example embodiments are illustrative in all aspects and do not limit the present disclosure.

What is claimed is:

1. A gate driver comprising:

a plurality of signal transmitters dependently connected via a carry line through which a carry signal is applied from a previous signal transmitter from the plurality of signal transmitters, wherein each of the plurality of signal transmitters includes:

a first circuit part configured to receive the carry signal from the previous signal transmitter and charge or discharge a first control node and a second control node;

a second circuit part configured to output a gate signal based on voltages at the first control node and the second control node; and a selection portion configured to invert a voltage applied to a first node during a frame skip interval of a partial area in a pixel array driven at a predetermined frame frequency, and charge the first control node with a voltage of the first node wherein the second circuit part comprises:

a first output transistor connected to a second power line transmitting a low potential voltage, and outputting the low potential voltage to the output node in response to the voltage of the first control node;

a second output transistor connected to a first power line transmitting a high potential voltage, and outputting the high potential voltage to an output node in response to the voltage of the second control node, and wherein the selection portion supplies the low potential voltage to the first node electrically connected to a gate electrode of the first output transistor during a first period of the frame skip interval, and supplies a start signal to the first node during a second period of the frame skip interval that is different from the first period.

2. The gate driver of claim 1, wherein the selection portion includes a first-A transistor and a first-B transistor, wherein the first-A transistor includes a gate electrode that receives a first reset signal, a first electrode that receives the start signal or the carry signal, and a second electrode connected to the first node, and the first-B transistor includes a gate electrode that receives a second reset signal having an opposite phase to the first reset signal, a first electrode connected to a second power line through which the low potential voltage is applied to the first electrode, and a second electrode connected to the first node.

3. The gate driver of claim 2, wherein the first reset signal and the second reset signal is a pulse voltage, a direct current voltage, or a clock voltage.

4. The gate driver of claim 2, wherein the first circuit part includes a first transistor, a second transistor, a third transistor, a fourth transistor, a fifth transistor, a first capacitor, and a second capacitor, wherein the first transistor includes a gate electrode connected to a fourth node to which a clock signal is applied, a first electrode connected to the first node, and a second electrode connected to a second node, the second transistor includes a gate electrode connected to the first node, a first electrode connected to a third node, and a second electrode connected to a first power line through which the high potential voltage is applied to the second electrode, the third transistor includes a gate electrode connected to the third node, a first electrode connected to the fourth node, and a second electrode connected to the second control node, the fourth transistor includes a gate electrode connected to the second node, a first electrode connected to the second control node, and a second electrode connected to the first power line, the fifth transistor includes a gate electrode connected to the second power line, a first electrode connected to the second node, and a second electrode connected to the first control node, the first capacitor is connected between the third node and the fourth node, and the second capacitor is connected between the second control node and the first power line.

5. The gate driver of claim 4, wherein the second circuit part further includes a third capacitor, wherein the first output transistor includes a gate electrode connected to the first control node, a first electrode connected to the second power line, and a second electrode connected to an output node, the second output transistor includes a gate electrode connected to the second control node, a first electrode connected to the output node, and a second electrode connected to the first power line, and the third capacitor is connected between the gate electrode of the first output transistor and the second electrode of the first output transistor.

6. A display device comprising:

a pixel array including a plurality of data lines, a plurality of gate lines, and a plurality of pixel circuits; and a gate driver configured to output a gate signal to the plurality of gate lines, wherein the pixel array includes a first pixel array driven at a first frame frequency, and a second pixel array driven at a second frame frequency that is less than the first frame frequency, and wherein the gate driver outputs the gate signal as a gate-off voltage during a frame skip interval of the second pixel array, wherein the gate driver includes a plurality of signal transmitters that are dependently connected via a carry line through which a carry signal is applied from a previous signal transmitter from the plurality of signal transmitters, wherein each of the plurality of signal transmitters includes:

a first circuit part configured to receive the carry signal from the previous signal transmitter and charge or discharge a first control node and a second control node;

a second circuit part configured to output a gate signal based on voltages at the first control node and the second control node; and a selection portion configured to invert a voltage applied to a first node during the frame skip interval, and charge the first control node with a voltage of the first node, wherein the second circuit part comprises:

a first output transistor connected to a second power line transmitting a low potential voltage, and outputting the low potential voltage to the output node in response to the voltage of the first control node; and a second output transistor connected to a first power line transmitting a high potential voltage, and outputting the high potential voltage to an output node in response to the voltage of the second control node, and wherein the selection portion supplies the low potential voltage to the first node electrically connected to a gate electrode of the first output transistor during a first period of the frame skip interval, and supplies a start signal to the first node during a second period of the frame skip interval that is different from the first period.

7. The display device of claim 6, further comprising:

a data driver configured to output a data voltage to the plurality of data lines, wherein the data driver does not output the data voltage during the frame skip interval.

8. The display device of claim 7, wherein the first pixel array and the second pixel array share the plurality of data lines with each other, but do not share the plurality of gate lines with each other.

9. The display device of claim 7, further comprising:

a timing controller configured to output a timing control signal that controls the data driver and the gate driver according to the first frame frequency and the second frame frequency.

10. The display device of claim 6, wherein the selection portion includes a first-A transistor and a first-B transistor, wherein the first-A transistor includes a gate electrode that receives a first reset signal, a first electrode that receives the start signal or the carry signal, and a second electrode connected to the first node, and the first-B transistor includes a gate electrode that receives a second reset signal having an opposite phase to the first reset signal, a first electrode connected to a second power line through which the low potential voltage is applied to the first electrode, and a second electrode connected to the first node.

11. The display device of claim 10, wherein the first reset signal and the second reset signal include a pulse voltage, a direct current voltage, or a clock voltage.

12. The display device of claim 10, wherein the first circuit part includes a first transistor, a second transistor, a third transistor, a fourth transistor, a fifth transistor, a first capacitor, and a second capacitor, wherein the first transistor includes a gate electrode connected to a fourth node to which a clock signal is applied, a first electrode connected to the first node, and a second electrode connected to a second node, the second transistor includes a gate electrode connected to the first node, a first electrode connected to a third node, and a second electrode connected to a first power line through which the high potential voltage is applied to the second electrode, the third transistor includes a gate electrode connected to the third node, a first electrode connected to the fourth node, and a second electrode connected to the second control node, the fourth transistor includes a gate electrode connected to the second node, a first electrode connected to the second control node, and a second electrode connected to the first power line, the fifth transistor includes a gate electrode connected to the second power line, a first electrode connected to the second node, and a second electrode connected to the first control node, the first capacitor is connected between the third node and the fourth node, and the second capacitor is connected between the second control node and the first power line.

13. The display device of claim 12, wherein the second circuit part further includes a third capacitor, wherein the first output transistor includes a gate electrode connected to the first control node, a first electrode connected to the second power line, and a second electrode connected to an output node, the second output transistor includes a gate electrode connected to the second control node, a first electrode connected to the output node, and a second electrode connected to the first power line, and the third capacitor is connected between the gate electrode of the first output transistor and the second electrode of the first output transistor.

* * * * *